(12) United States Patent
Pham et al.

(10) Patent No.: US 7,565,532 B2
(45) Date of Patent: Jul. 21, 2009

(54) SECURE FILE SYSTEM SERVER ARCHITECTURE AND METHODS

(75) Inventors: Duc Pham, Cupertino, CA (US); Tien Le Nguyen, Cupertino, CA (US); Pu Paul Zhang, San Jose, CA (US); Mingchen Lo, Fremont, CA (US)

(73) Assignee: Vormetric, Inc., Santa Clara, CA (US)

( * ) Notice: Subject to any disclaimer, the term of this patent is extended or adjusted under 35 U.S.C. 154(b) by 0 days.

(21) Appl. No.: 11/584,971

(22) Filed: Oct. 23, 2006

(65) Prior Publication Data

US 2007/0050620 A1 Mar. 1, 2007

Related U.S. Application Data

(62) Division of application No. 10/271,050, filed on Oct. 16, 2002, now Pat. No. 7,143,288.

(51) Int. Cl.
*H04L 9/32* (2006.01)
*G06F 17/30* (2006.01)
*H04K 1/00* (2006.01)
*G06F 7/04* (2006.01)

(52) U.S. Cl. ............... 713/165; 713/164; 713/166; 713/167; 713/151; 713/152; 726/28

(58) Field of Classification Search ............. 713/193, 713/165, 167, 164, 166, 151, 152; 726/28
See application file for complete search history.

(56) References Cited

U.S. PATENT DOCUMENTS 4,423,287 A 12/1983 Zeidler (Continued)

FOREIGN PATENT DOCUMENTS

WO WO 01/37095 5/2001

(Continued)

OTHER PUBLICATIONS

Blaze, Matt. "A cryptographic file system for UNIX", Conference on Computer and Communications Security, Proceedings of the 1st ACM conference on Computer and communications security, 1993.*

(Continued)

*Primary Examiner*—Michael J Simitoski
(74) *Attorney, Agent, or Firm*—NewTechLaw; Gerald B. Rosenberg, Esq.

(57) ABSTRACT

A data server platform includes a security file system layer interposed between the platform operating system kernel and file system. The secure file system layer is structured to implement a file access control function that selectively constrains data transfer operations initiated through the operating system kernel by an application program to transfer file data through the file system with respect to a persistent data store. A file access controller, implemented independent of the operating system kernel, is coupled to the security file system layer and supports the file access control function by defining permitted file data transfers through the file system. Management of the file access controller separate from the data server platform ensures that any security breach of the platform operating system kernel cannot compromise the function of the security file system layer.

10 Claims, 11 Drawing Sheets

U.S. PATENT DOCUMENTS

| | | | |
|---|---|---|---|
| 4,503,287 A | 3/1985 | Morris et al. | |
| 4,588,991 A | 5/1986 | Atalla | |
| 4,649,233 A | 3/1987 | Bass et al. | |
| 5,065,429 A | 11/1991 | Lang | |
| 5,150,407 A | 9/1992 | Chan | |
| 5,235,641 A | 8/1993 | Nozawa et al. | |
| 5,235,642 A | 8/1993 | Wobber et al. | |
| 5,321,841 A | 6/1994 | East et al. | |
| 5,349,642 A | 9/1994 | Kingdon | |
| 5,412,717 A | 5/1995 | Fischer | |
| 5,440,635 A | 8/1995 | Bellovin et al. | |
| 5,453,979 A | 9/1995 | Schibler et al. | |
| 5,506,961 A | 4/1996 | Carlson et al. | |
| 5,539,883 A | 7/1996 | Allon et al. | |
| 5,550,984 A | 8/1996 | Gelb | |
| 5,564,106 A | 10/1996 | Puhl et al. | |
| 5,566,170 A | 10/1996 | Bakke et al. | |
| 5,586,260 A | 12/1996 | Hu | |
| 5,602,918 A | 2/1997 | Chen et al. | |
| 5,638,448 A | 6/1997 | Nguyen | |
| 5,649,099 A | 7/1997 | Theimer et al. | |
| 5,655,120 A | 8/1997 | Witte et al. | |
| 5,657,390 A | 8/1997 | Elgamal et al. | |
| 5,680,461 A | 10/1997 | McManis | |
| 5,682,478 A | 10/1997 | Watson et al. | |
| 5,701,343 A | 12/1997 | Takashima et al. | |
| 5,720,034 A | 2/1998 | Case | |
| 5,754,791 A | 5/1998 | Dahlgren et al. | |
| 5,774,668 A | 6/1998 | Choquier et al. | |
| 5,784,463 A | 7/1998 | Chen et al. | |
| 5,790,800 A | 8/1998 | Gauvin et al. | |
| 5,819,045 A | 10/1998 | Raman et al. | |
| 5,822,531 A | 10/1998 | Gorczyca et al. | |
| 5,825,890 A | 10/1998 | Elgamal et al. | |
| 5,850,395 A | 12/1998 | Hauser et al. | |
| 5,850,446 A | 12/1998 | Berger et al. | |
| 5,862,348 A | 1/1999 | Pedersen | |
| 5,872,783 A | 2/1999 | Chin | |
| 5,905,725 A | 5/1999 | Sindhu et al. | |
| 5,918,074 A | 6/1999 | Wright et al. | |
| 5,922,073 A | 7/1999 | Shimada | |
| 5,931,947 A | 8/1999 | Burns et al. | |
| 5,940,507 A | 8/1999 | Cane et al. | |
| 5,941,947 A | 8/1999 | Brown et al. | |
| 5,974,463 A | 10/1999 | Warrier et al. | |
| 6,006,259 A | 12/1999 | Adelman et al. | |
| 6,038,668 A | 3/2000 | Chipman et al. | |
| 6,052,785 A | 4/2000 | Lin et al. | |
| 6,061,650 A | 5/2000 | Malkin et al. | |
| 6,061,796 A | 5/2000 | Chen et al. | |
| 6,078,943 A | 6/2000 | Yu | |
| 6,078,960 A | 6/2000 | Ballard | |
| 6,084,969 A | 7/2000 | Wright et al. | |
| 6,091,720 A | 7/2000 | Bedard et al. | |
| 6,104,716 A | 8/2000 | Crichton et al. | |
| 6,157,649 A | 12/2000 | Peirce et al. | |
| 6,157,955 A | 12/2000 | Nerad et al. | |
| 6,158,011 A | 12/2000 | Chen et al. | |
| 6,160,819 A | 12/2000 | Partridge et al. | |
| 6,173,306 B1 | 1/2001 | Raz et al. | |
| 6,175,924 B1 | 1/2001 | Arnold | |
| 6,185,684 B1 | 2/2001 | Pravetz et al. | |
| 6,199,077 B1 | 3/2001 | Inalla et al. | |
| 6,202,157 B1 | 3/2001 | Brownlie et al. | |
| 6,219,790 B1 | 4/2001 | Lloyd et al. | |
| 6,246,771 B1 | 6/2001 | Stanton et al. | |
| 6,249,866 B1 * | 6/2001 | Brundrett et al. | 713/165 |
| 6,252,878 B1 | 6/2001 | Locklear, Jr. et al. | |
| 6,253,193 B1 | 6/2001 | Ginter et al. | |
| 6,253,321 B1 | 6/2001 | Nikander et al. | |
| 6,259,699 B1 | 7/2001 | Opalka et al. | |
| 6,260,155 B1 | 7/2001 | Dellacona | |
| 6,263,445 B1 | 7/2001 | Blumenau | |
| 6,266,705 B1 | 7/2001 | Ullum et al. | |
| 6,272,522 B1 | 8/2001 | Lin et al. | |
| 6,282,652 B1 | 8/2001 | Scheifler | |
| 6,286,104 B1 | 9/2001 | Buhle et al. | |
| 6,292,827 B1 | 9/2001 | Raz | |
| 6,304,973 B1 | 10/2001 | Williams | |
| 6,327,622 B1 | 12/2001 | Jindal et al. | |
| 6,330,677 B1 | 12/2001 | Madoukh | |
| 6,351,775 B1 | 2/2002 | Yu | |
| 6,354,886 B1 | 3/2002 | Howard et al. | |
| 6,378,072 B1 * | 4/2002 | Collins et al. | 713/187 |
| 6,405,315 B1 | 6/2002 | Burns et al. | |
| 6,424,621 B1 | 7/2002 | Ramaswamy et al. | |
| 6,438,612 B1 | 8/2002 | Ylonen et al. | |
| 6,438,652 B1 | 8/2002 | Jordan et al. | |
| 6,470,389 B1 | 10/2002 | Chung et al. | |
| 6,477,644 B1 | 11/2002 | Turunen | |
| 6,480,861 B1 | 11/2002 | Kanevsky et al. | |
| 6,487,605 B1 | 11/2002 | Leung | |
| 6,493,318 B1 | 12/2002 | Bare | |
| 6,493,341 B1 | 12/2002 | Datta et al. | |
| 6,496,932 B1 | 12/2002 | Trieger | |
| 6,499,110 B1 | 12/2002 | Moses et al. | |
| 6,502,192 B1 | 12/2002 | Nguyen | |
| 6,505,254 B1 | 1/2003 | Johnson et al. | |
| 6,505,300 B2 | 1/2003 | Chan et al. | |
| 6,519,636 B2 | 2/2003 | Engel et al. | |
| 6,529,950 B1 | 3/2003 | Lumelsky et al. | |
| 6,539,483 B1 | 3/2003 | Harrison et al. | |
| 6,542,992 B1 | 4/2003 | Peirce et al. | |
| 6,560,217 B1 | 5/2003 | Peirce et al. | |
| 6,571,287 B1 | 5/2003 | Knight et al. | |
| 6,584,508 B1 | 6/2003 | Epstein et al. | |
| 6,594,763 B1 | 7/2003 | Madoukh | |
| 6,845,395 B1 | 1/2005 | Blumenau et al. | |
| 2001/0016907 A1 | 8/2001 | Kang et al. | |
| 2002/0178271 A1 * | 11/2002 | Graham et al. | 709/229 |
| 2002/0184487 A1 | 12/2002 | Badamo et al. | |
| 2002/0194495 A1 | 12/2002 | Gladstone et al. | |

FOREIGN PATENT DOCUMENTS

| | | |
|---|---|---|
| WO | WO 02/093314 | 11/2002 |
| WO | WO 02/093389 | 11/2002 |
| WO | WO 02/103498 | 12/2002 |

OTHER PUBLICATIONS

Zadok, Erez et al. "Cryptfs: A Stackable Vnode Level Encryption File System", 1998.*

IBM, IBM Network Processor (IBM32NPR161EPXCAC133) Product Overview, Published Oct. 4, 1999.

BROADCOM, BCM5820 E-Commerce Product Brief, 5820-PB00-R-3.26.01, Published 2001.

BROADCOM, BCM5840 Gigabit Security Processor Product Brief, 5840-PB00-R-12.6.00, Published 2000.

IBM, The Network Processor—Enabling Technology for High-Performance Networking, Published Aug. 1999.

IBM, Packet Routing Switch PRS28G Product Sheet, Undated.

IBM, Packet Routing Switch PRS28G, Version 1.7 Datasheet, prs28.04.fm, Feb. 6, 2001.

IBM, IBM PowerNP™ NP4GS3 Network Processor Preliminary Datasheet, May 18, 2001.

IBM, Product Overview, IBM PowerNP NP4GS3, Network Processor Solutions, Apr. 16, 2001.

Alan Radding, Storage ROI: Truth & Fiction, Infoworld Custom Meda Group, 2001.

IETF, IP Storage Working Group, iSCSI Requirements and Design Considerations, Document: draft-ietf-ips-iscsi-reqmts-05.txt, Jul. 2001.

IETF, IP Security Working Group, Security Properties of the IPsec Protocol Suite, Document draft-krywaniuk-ipsec-properties-00.txt, Jul. 9, 2001.

IETF, iSCSI, Document draft-ietf-ips-iscsi-08.txt, Sep. 30, 2001.

Yoshida et al., Virtualization—The Promise and the Reality, Sun Microsystems White Paper, 2001.

* cited by examiner

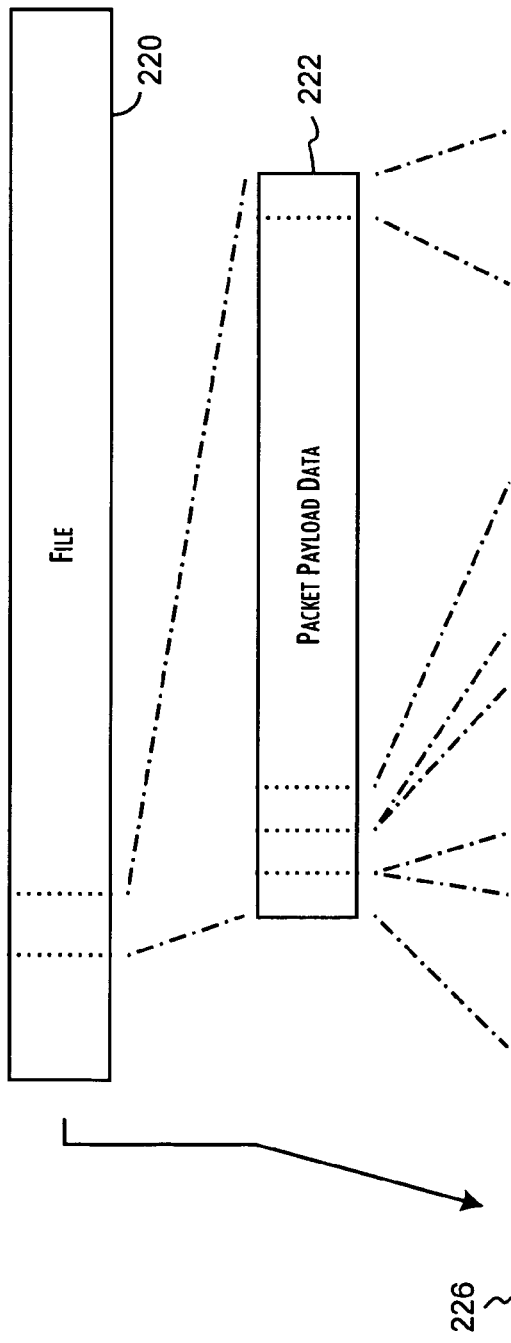
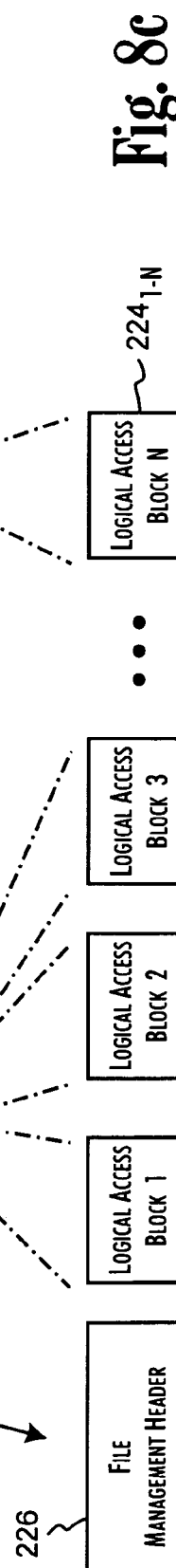
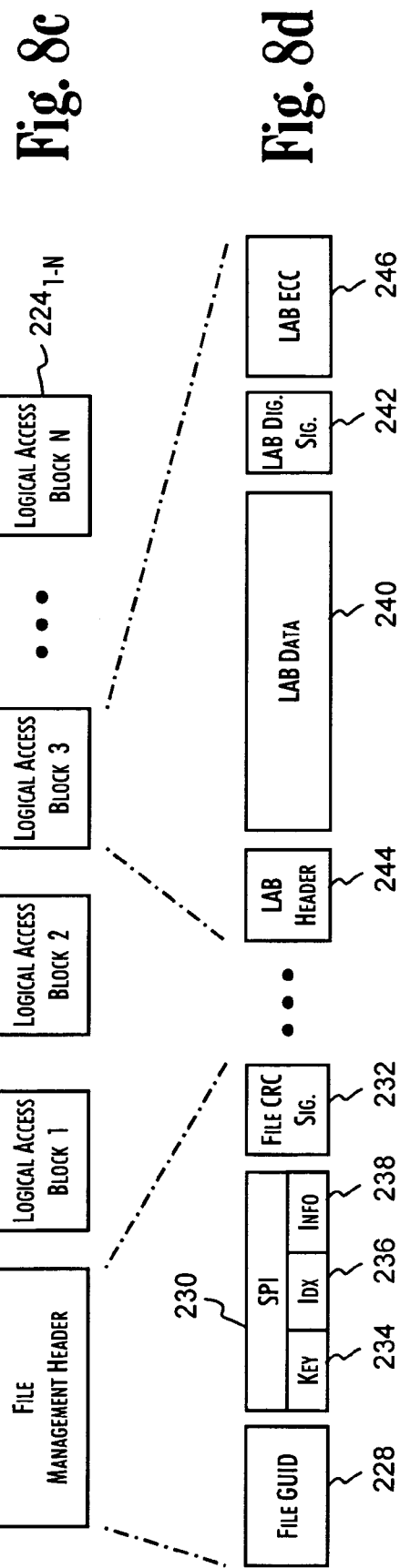
Fig. 8a
Fig. 8b
Fig. 8c
Fig. 8d

SECURE FILE SYSTEM SERVER ARCHITECTURE AND METHODS

REFERENCE TO RELATED APPLICATION

The present application is a divisional of prior application Ser. No. 10/271,050, filed Oct. 16, 2002, now U.S. Pat. No. 7,143,288, issued Nov. 28, 2006.

BACKGROUND OF THE INVENTION

1. Field of the Invention

The present invention is generally related to systems and methods of protecting persistently stored data from unauthorized access and modification and, in particular, to a system and method of reliably securing persistent data managed through a file system server operating in the role of an application or database service provider platform.

2. Description of the Related Art

Maintaining robust and verifiable security over persistently stored data has and continues to be a primary requirement in the operation of commercial, governmental, and essentially all other computing environments. Achieving a desired high level of security, however, is not commonly realized for a variety of reasons. With the fast-paced development particularly of the Internet infrastructure, the diversity of network architectures, infrastructure devices, and computer protocols has rapidly increased. Thus, the number, variety, and complexity of computer systems and network components that must be cooperatively managed to establish at least a minimum uniform level of security within some defined domain has correspondingly increased. The practical difficulties of coordinated management of the different systems and components, as well as systemic failures to protect against both known and previously unrecognized security attack approaches, also contribute to the vulnerabilities of systems and networks to security breaches.

Conventionally, security protections for a given domain are layered and specialized depending on the operational nature of corresponding individual computer systems and network components. Typically, these security protections are implemented variously as password challenges and data and connection filters layered over the core functionality of a computer system or network component. The conventional implementation of security functions in software in computer systems and network components implicitly recognizes the inherent complexity of establishing robust security mechanisms and the very practical need to frequently apply patches to close both previously unrecognized and newly emergent vulnerabilities.

Different architectural approaches have been explored to minimize the vulnerabilities of different security mechanisms to attack and, ultimately, loss of security over persistently stored data. U.S. Pat. No. 5,007,082, issued Apr. 9, 1991 to Cummins, describes an early data security system applicable to file data transfers. Balancing the need for security, transparency of use and compatibility, Cummins describes a hardware specific, software-based encryption control system that interoperates with the platform operating system at the basic I/O system (BIOS) level. File data transfer operations provided by the BIOS are selectively re-vectored to compatible routines implementing encryption and decryption functions against file level data. The described functions perform file-level encryption and decryption. Consequently, full file reads and writes are required to support application program read/write support. Compatibility further requires that the relevant file data memory buffers must be maintained in an unencrypted state to support dynamic read/write operations directed by executing applications.

U.S. Pat. No. 5,584,023, issued Dec. 10, 1996 to Hsu describes a similar, but more advanced software-based file-data encryption system. An operating system kernel mode driver is used to re-vector selected file data related operating system calls at the system call interface level. The underlying operating system provided file-oriented system calls are wrapped to support block-level encryption and decryption services, where the block size is determined by the nominal operation of the operating system. File blocks retrieved from encrypted files are generally maintained in an encrypted state while managed by the operating system within the kernel space buffer cache. The encryption and decryption algorithms utilize password keys to select encryption code tables defined against user related processes and initialized with the invocation of an initial user process. Separate file attribute tables, populated from data appended to the individual disk files, define the encryption attributes of individual actively accessed files. The various code and attribute tables are dynamically allocated and limit pointer references to increase the difficulty in tracing the data structures and the corresponding operation of the kernel mode driver.

A more involved, but similar encryption system is described in U.S. Pat. No. 6,249,866, issued Jun. 19, 2001 to Brundrett et al. An extensive modification of the operating system is described to integrate both file and file system encryption functions into a logically unified view of the underlying file system space. Operating system calls to read and write data are evaluated on interception to determine if the calls are directed to an encrypted file system directory or file. System call file data transferred relative to an encryption flagged directory or file is encrypted or decrypted utilizing a key associated with the target directory or file utilizing a kernel mode driver layered above a conventional file system, such as the NT file system (NTFS). The encryption keys and encryption driver management systems are implemented as a combination of operating system kernel functions and user-mode key management applications.

While these conventional security systems provide a significant degree of security over persistent stored data, each fails to establish a comprehensive security system. Each of these systems remains particularly vulnerable to basic Trojan attacks for obtaining passwords and encryption keys, thereby permitting complete conversion of the security systems to support inappropriate access to and modification of the persistent stored data. Furthermore, these systems provide no protection against the execution of user-mode programs that may exploit vulnerabilities in the operating system to gain unlimited root or administrator control over the operating system. An intruder can then either directly circumvent the kernel password and encryption mechanisms or breach the security of the password and encryption key management systems to obtain the passwords and keys. In either case, the intruder again obtains unencumbered access to the ostensibly secured persistently stored data over the heightened encryption-based security capabilities with little greater difficulty than exploiting the typically limited security protections afforded by the operating system itself.

Ultimately, the security systems described by Cummins, Hsu, and Brundrett et al. rely on the basic security subsystems of the local operating system to prevent attack on the underlying encryption mechanisms. Where utilized on systems that are part of an extended security domain, these and similar systems also inherently rely on whatever cooperative management policies are enforced for the coordinated configuration of the required password and encryption key management systems. Unintended errors and perhaps more typically lapses in the consistent and comprehensive management of the security mechanisms protecting the security domain only increase the availability of operating system vulnerabilities that may be exploited to penetrate the security domain and inappropriately permit access to persistently stored data.

Consequently, there is a clear need for mechanisms to secure persistent data that are ultimately reliable and cooperatively manageable.

SUMMARY OF THE INVENTION

Thus, a general purpose of the present invention is to provide an efficient and effective mechanism for reliably securing persistent data in a manner eminently subject to cooperative management and control within a security domain.

This is achieved in the present invention by providing, on a data server platform, a security file system layer interposed between the platform operating system kernel and file system. The secure file system layer is structured to implement a file access control function that selectively constrains data transfer operations initiated through the operating system kernel by an application program to transfer file data through the file system with respect to a persistent data store. A file access controller, implemented independent of the operating system kernel, is coupled to the security file system layer and supports the file access control function by defining permitted file data transfers through the file system.

An advantage of the present invention is that the management of the file access controller is separate from the data server platform. This ensures that any security breach of the platform, including specifically the operating system kernel, does not and cannot compromise the essential function of the security file system layer as supported by the independently managed file access controller.

Another advantage of the present invention is that the security file system layer permits a broad range of security information to be collected and processed through the file access controller as a basis for determining permissions for file accesses. Collection of authentication, authorization and authenticity information can be efficiently performed by or through the security file system layer. The independently secure evaluation of the collected information ensures the secure function of the security file system layer in selectively enabling file data access and modification.

A further advantage of the present invention is that minimal platform modifications are required to ensure the security of persistent platform accessible data. Implementation of the security file system layer is consistent with the architectural model of conventional operating systems supporting virtual file system support.

Still another advantage of the present invention is that the secure file system layer, in combination with the file access controller, provides a comprehensive security envelope relative to persistent stored data accessible through a protected computer platform. The security envelope includes identity authentication, access authorization and application authenticity to ensure that only well-identified users, subject to defined policy permissions can access persistent stored data through certified applications. The integrity of the persistent stored data is further preserved through data encryption subject to dynamic tamper detection.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein:

FIGS. 8A-D illustrates the preferred decomposition of file data through the network packet protocol processing implemented in accordance with a preferred embodiment of the present invention;

DETAILED DESCRIPTION OF THE INVENTION

Figure 1:
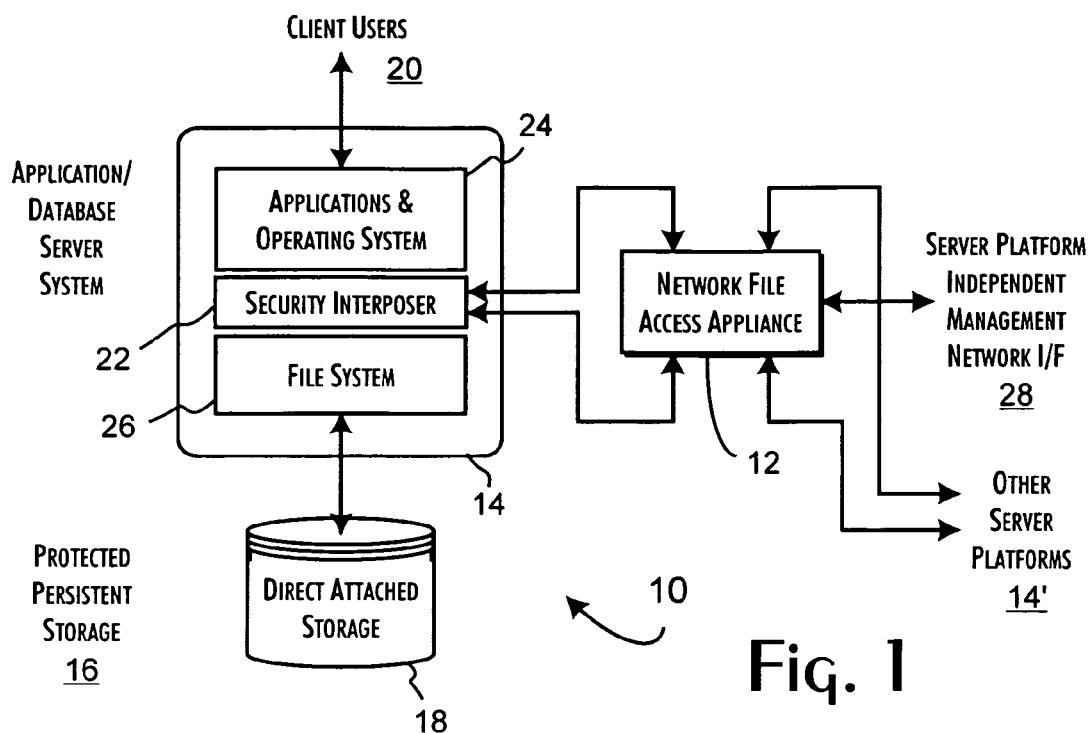
FIG. 1 is a top-level block diagram illustrating the intended operating environment of a preferred embodiment of the present invention.

The present invention utilizes and extends the operation of a secure network file system appliance to establish a security envelope protecting persistent stored data accessible through various computer system platforms. An exemplary server platform protected environment 10 is shown in FIG. 1. A secure network file access appliance 12 is preferably implemented in the environment 10 to support the secure operation of one or more computer server platforms 14, 14' relative to protected persistent storage resources 16, such as direct attached storage 18. For purposes of the preferred embodiments of the present invention, the computer system platforms 14, 14' are database and application server platforms supporting local and remote client systems and users 20. The secure network file system appliance is integrated with the computer system platform 14 through a security interposer layer 22 established between the operating system kernel 24 and a file system 26 through which data is transferred relative to direct attached storage 18.

The security interposer layer 22 selectively routes file oriented data transfers between the operating system kernel 24 and file system 26 through the secure network file access appliance 12 to encrypt and decrypt the file data stored to the protected persistent storage resources 16 subject to access policies implemented within the secure network file access appliance 12. In accordance with the present invention, the file data encryption maintains the logical file-oriented structure of the data and is thus transparent to the persistent storage resources 16. Additionally, the secure network file access appliance 12 can implement IP firewall functions, limiting potential attacks on the security of the secure network file system appliance from the computer server platforms 14, 14'.

Clients and users 20 are unaffected by the security support and encryption functions of the secure network file access appliance 12, yet are secured against unauthorized access of the encrypted content. Actively used file data encryption keys are preferably held and managed within the secure network file access appliance 12 essentially independent of the computer server platform 14. A logically and preferably physically separate private network interface 28 is supported by the secure network file access appliance 12 to control effectively single-point secure management over the secure network file access appliance 12 by a centralized security management system. Thus, the encryption keys utilized by the secure network file access appliance 12 are not accessible in usable form as a consequence of a security breach of the computer system platform 14, direct attached storage 18, or client users 20.

Preferably, the secure network file access appliance 12 processes file data read and write requests in aggregate at wire-speed and with minimal latency in qualifying the access privileges of each read, write, and related file access request, to selectively encrypt and decrypt file data transferred, and further selectively compress and decompress the transferred file data. The round-trip encryption of file data ensures that all protected data stored by persistent storage resources 16, including the direct attached storage 18, are secure both as transferred and while statically stored. Round-trip compression can substantially reduce the needed file data transfer bandwidth, particularly where the transfers are for repeated mass archival backups.

Figure 2:
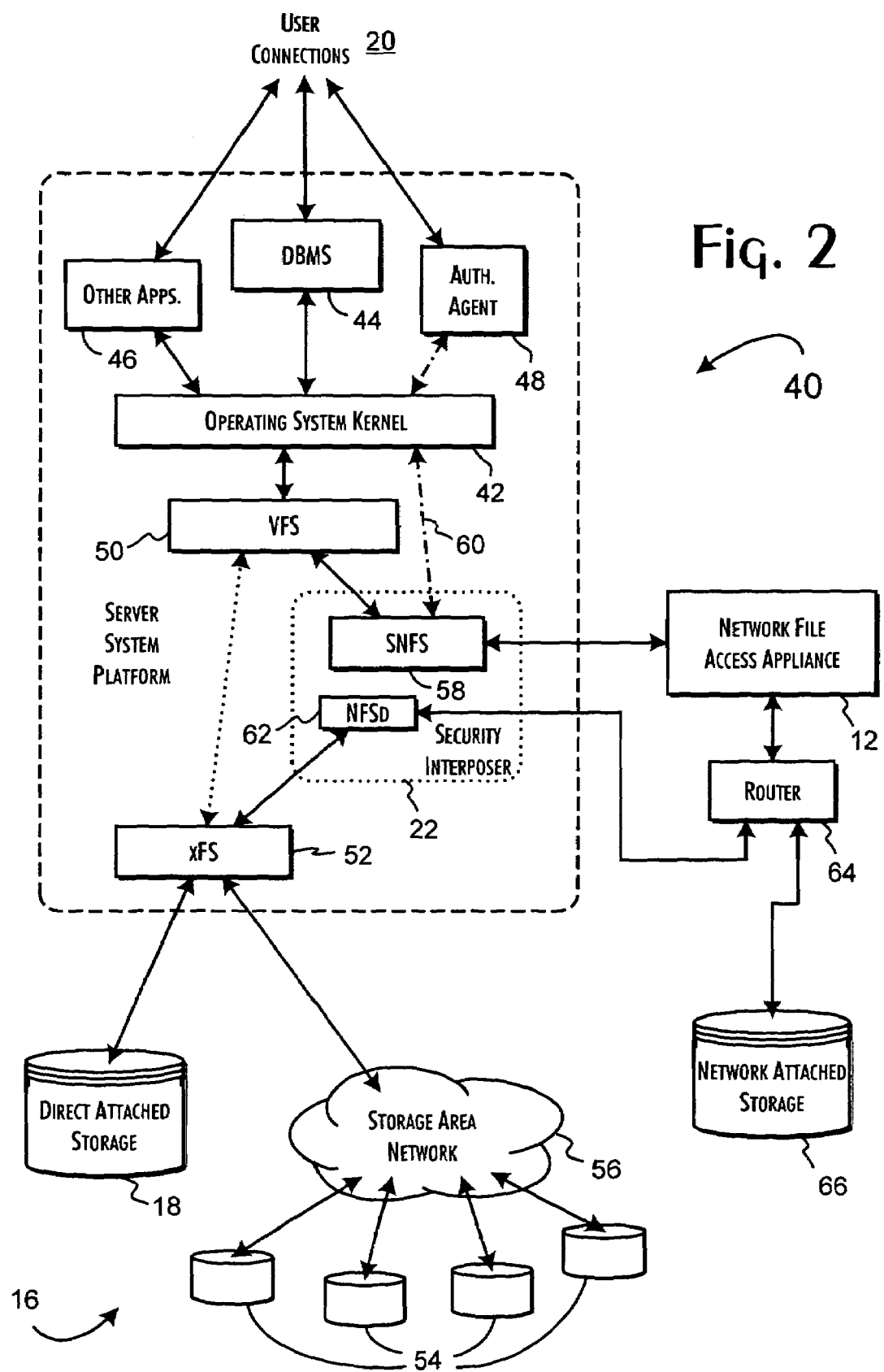
FIG. 2 is a detailed architectural block diagram of a preferred implementation of the present invention.

The preferred structure 40 of a computer system platform 14 is shown in FIG. 2. The platform 14 conventionally includes an operating system kernel 42 supporting execution of applications, such as a database management system (DBMS) 44 and other server applications 46, in a user mode execution space. The operating system kernel 42 also preferably supports execution of an authentication agent program 48 substantially, if not completely, within a kernel mode execution space. A virtual file system switch (VFS) 50 provides a conventional interface to any number of different conventional file systems (xFS) 52 as necessary to access conventional direct attached storage 18 and, for example, storage devices 54 accessible through a storage area network 56.

In a first preferred embodiment of the present invention, the security interposer layer 22 is implemented utilizing a secure network file system (SNFS) 58 and a conventional network file system (NFS) client file system daemon (NFSd) 62. The secure network file system 58 is preferably based on a conventional network file system (NFS) implementation used to route network file transfer requests and data through the secure network file access appliance 12. The secure network file system 58 includes modifications to enable collection of user, process and session information through an interface 60 to the operating system kernel 42, in regard to specific network file transfer requests, and to provide this information to the secure network file access appliance 12 as a basis for determining whether to permit the corresponding network file transfer to proceed.

Network file data transfers permitted by the secure network file access appliance 12, including any associated transparently encrypted and compressed data, are processed through the NFS daemon 62 and an appropriate file system 52 as necessary to transfer data relative to the persistent storage resources 16. Alternately, the secure network file access appliance 12 may determine to route the network file request and data through a network infrastructure, as generally represented by router 64, to conventional network attached storage 66 operating as a network file system client. Utilization of the conventional NFS protocols between the secure network file access appliance 12 and at least the NFS client daemon 62 enables substantial flexibility in using direct attached storage 18, storage area networks 56, and network attached storage 66.

For a second preferred embodiment of the present invention, the necessary complexity of maintaining NFS protocol compliance and the overhead of executing NFS client daemons 62 may be avoided by implementing an RPC-based communications protocol between the security interposer layer 22 and secure network file access appliance 12. While using RPC-based messages functionally similar to the NFS protocol, the requirements for formal NFS compatibility are obviated and both server and client communications functions can be merged into a single, concisely defined secure virtual file system layer (SVFS). In this embodiment, the security interposer layer 22 again implements the interface 60 to the operating system kernel 42 and supports any combination of an overlay interface to a conventional file system 52, a captive file system, generally equivalent to the file system 52 though implemented as an internal component of the security interposer layer 22, and a direct interface to the direct attached storage 18 in support of a file system externally implemented as part of the secure network file access appliance 12.

Implementation of comprehensive access policy controls in the secure network file access appliance 12, essentially independent though additive to those of the computer system platform 14, enables centralized secure file data access management. The access permissions and other controls implemented by multiple computer system platforms 14, 14' and potentially other network components implementing the persistent storage resources 16 are difficult to globally maintain through additions and reconfigurations of the various storage devices 18, 54, 64. The access policy controls provided by the secure network file access appliance 12 are significantly more comprehensive, flexible, and administratively uniform than conventional access permissions supported by computer system platforms 14, 14'.

Authentication controls are also supported by the secure network file access appliance 12 as a complement to the access policy controls. For the preferred embodiments of the present invention, the security interposer layer 22 interoperates with the authentication agent program 48 installed and executed on the computer system platforms 14, 14' to enable user and client authentication, including authentication over user sessions and processes. Specifically, the security interposer layer 22 supports a modified file system interface, compatible with the virtual file system switch 50 as implemented by the conventional operating system kernel 24, to provide selective authentication processing of file system requests directed to the protected persistent storage resources 16. For the preferred embodiments of the present invention, the file system switch interface security interposer layer 22 is mounted through the file system switch 50 against the directory nodes representing protected persistent storage resources 16. Authentication logic provided in the agent program 48, preferably executing in kernel space, is called through the operating system kernel 42 in response to file system operations directed against the security interposer layer 22. Through the operating system kernel 24, the agent program 48 has access to user, client process, application, and session information. Where attended user authentication is required, the agent program 48 preferably interoperates through the operating system kernel 42 to assert an authentication dialog for a user 20. User responsive information can then be authenticated using standard authentication controls, such as LDAP and other network available authentication servers (not shown). Alternately, or in combination, the user authentication response information can be transmitted to the secure network file access appliance 12 for security qualification.

Authentication of user applications 44, 46 executed within the application execution space supported by the operating system kernel 42 is performed autonomously through the agent program 48. Preferably in response to a first file system operation by a user 20 application, as received by the security interposer layer 22, or on notice from the operating system 42 of the invocation of the user application, the agent program 48 generates a secure hash identification of the loaded binary image of the user application. This hash identifier and the application file attributes are then transmitted to the secure network file access appliance 12 for verification. An authentication response is returned to the agent program providing verification status. A verification failure or other exception indicated by the secure network file access appliance 12 preferably results in a disallowance of the requested file system operation.

Unattended execution of applications by the computer system platform 14, such as on booting of the platform 14, can also be supported through the application authentication mechanism. Preferably, an application launcher utility is scripted to execute on boot. Through application authentication of the utility, the absence of attended user authentication derived information is not treated as an exception by the secure network file access appliance 12. The application launcher utility is then enabled to launch a designated application.

The state of user and application authentication, in combination with user session and associated process identifiers, is preferably maintained by the agent program 48 or within the security interposer layer 22. In the preferred embodiments of the present invention, this authentication information and the digital signature of the agent program 48 are combined and sent encrypted to the secure network file access appliance 12 with each file system request received by to the interposer layer 22. Where an NFS communications protocol is utilized between the security interposer layer 22 and secure network file access appliance 12, the NFS packets are modified to include the user and agent authentication information with the file system requests. In the preferred embodiment, an NFS packet header field is extended, preferably by redefinition of an existing field, to store and transfer the user and agent authentication information. Additionally, periodic or heartbeat status remote procedure call (RPC) packets are sent by the agent program 48 to the secure network file access appliance 12 reflecting the current state of the user and agent authentication information. Computer system platform 14 changes relevant to authentication, including specifically terminations of processes and user sessions, are thereby rapidly noticed to the secure network file access appliance 12.

Figure 3:
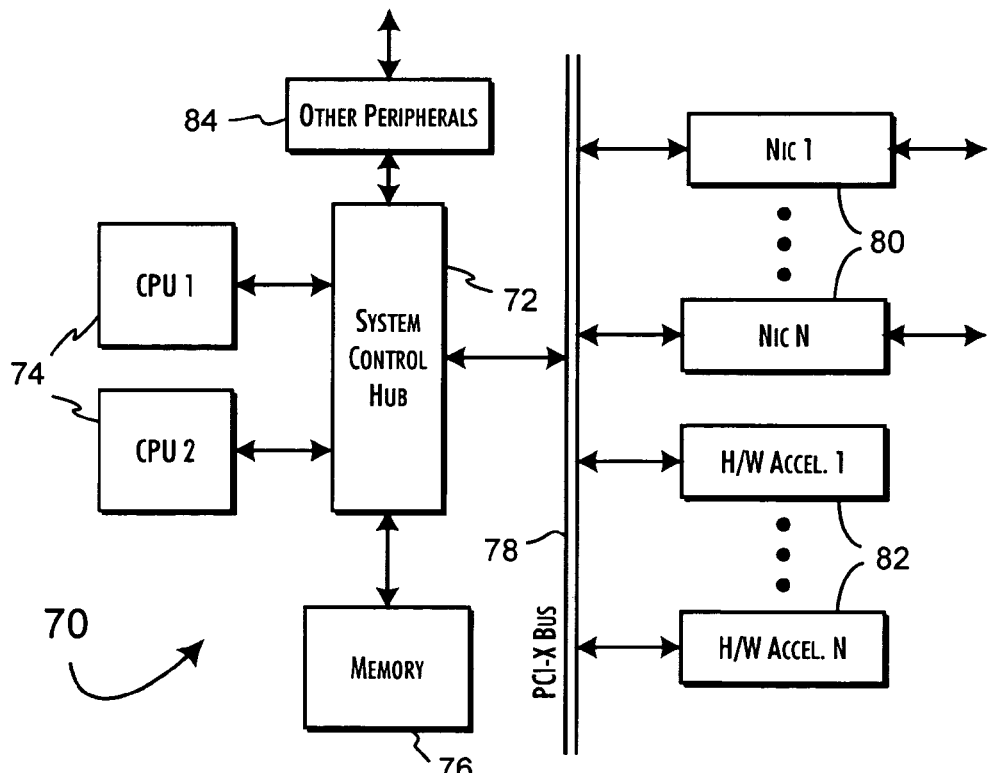
FIG. 3 is an architectural block diagram of a preferred, fixed scale appliance embodiment of the present invention.

A preferred, fixed scale, hardware platform 70 for the present invention is shown in FIG. 3. The platform 70 is preferably implemented on a motherboard supporting the Intel® E7500 chipset 72, dual 2.2 GHz Intel® Xeon™ processors 74 (Intel Corporation, Santa Clara, Calif.; www.intel.com), and a 1-Gbyte 200-MHz Double Data Rate (DDR) main memory array 76. The chipset 72 supports six PCI-X buses 78, individually capable of over 8-Gbps throughput and an aggregate throughput of at least 24-Gbps. A basic configuration of two 1-Gbps network interface controllers 80, supporting ingress and egress network connections, and one 10/100 Mbps network interface controller 80, supporting the management network connection 28, are connected to the PCI-X bus 78. A base configuration of three HiFn™ 7851 security processors 82 (HiFn, Inc., Los Gatos, Calif.; www.hifn.com) provides hardware accelerated encryption and compression support for the generic data processing and control function of the processors 74. The security processors support symmetric programmable length block encryption algorithms, including 3-DES, at throughputs in excess of 400-Mbps per chip and programmable length block compression algorithms, including LZS, at throughputs in excess of 80 MBps.

Other peripherals 84, including a BIOS program and boot hard disk drive, are supported though the chipset 72 to enable basic operation of the hardware platform 70. Preferably, the hardware platform 70 boots and runs a Linux™ based operating system, based on a commercial distribution of Red Hat™ Linux (Red Hat, Inc., Raleigh, N.C.; www.redhat.com). The software-based authentication and access functions of the secure network file access appliance 12 preferably load and execute in the Linux kernel space. Administrative and support utilities are preferably implemented as user-mode applications and daemons.

Figure 4:
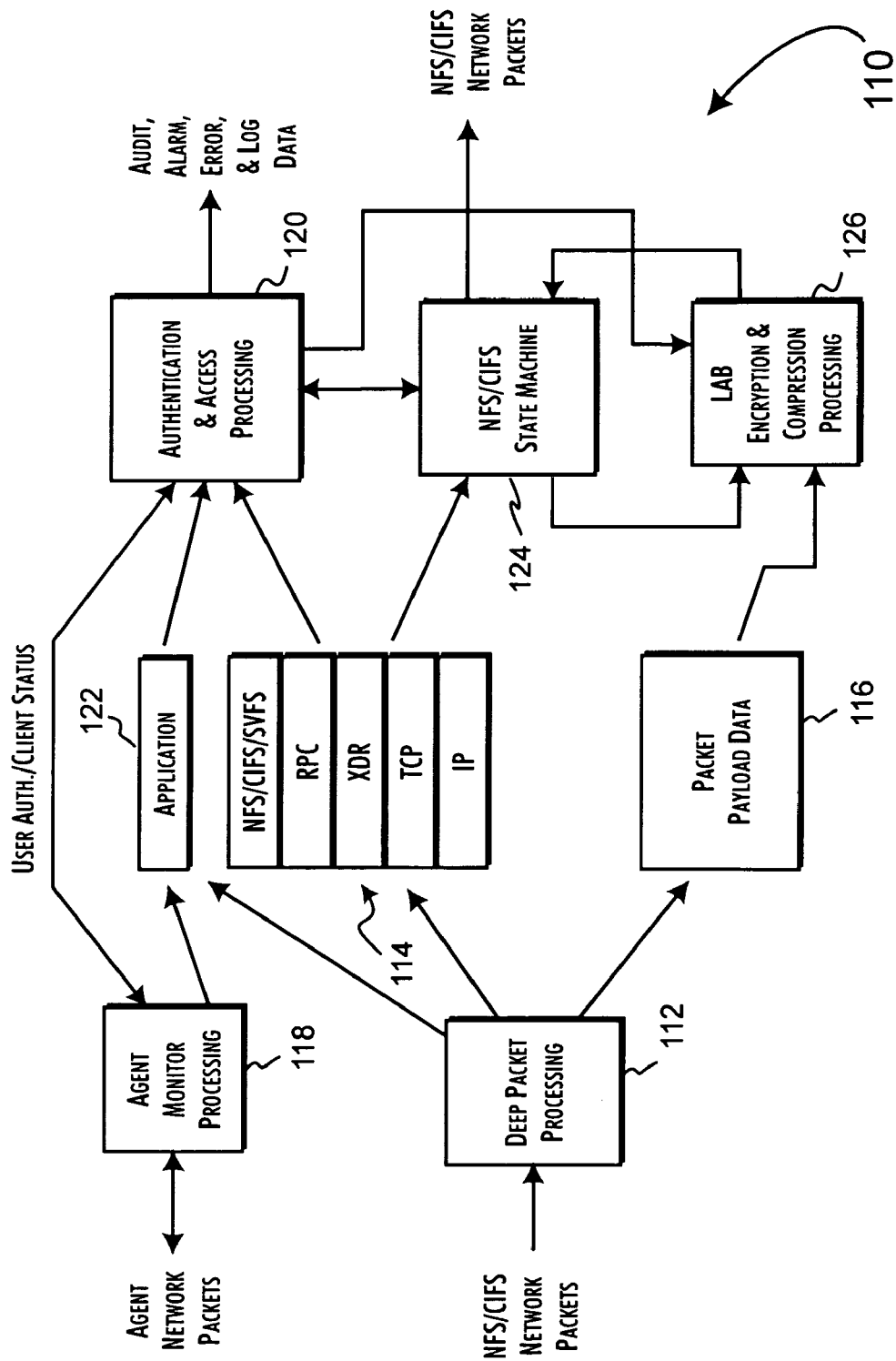
FIG. 4 is a process flow diagram illustrating the deep packet analysis processing provided in accordance with the present invention to support authentication and access qualification of client file oriented network requests directed to network storage resources.

The logical control and protocol processing functions implemented in the control programs executed on a hardware platform 70 for a preferred embodiment of the present invention are shown in FIG. 4. Inbound file requests are received as network data packets containing the various network file system messages implemented by a network distributed file system, such as the network file system (NFS), common internet file system (CIFS), or whatever secure virtual file system (SVFS) protocol is implemented by the security interposer layer 22. These network data packets are processed to expose the control information 114 contained in the protocol layers of each received data packet and the packet payload data 116 for examination and processing.

Additionally, application and status information is gathered by an agent monitoring process 118 listening on a dedicated network port connected to the computer system platforms 14, 14'. Client status information, obtained from heartbeat network packets, is relayed to an authentication and access control process 120. Continuity of a client heartbeat is used to maintain a client authorization session. User authentication session information, minimally reflecting that a user authentication sequence mediated by the agent program 48 has completed successfully, can also be provided to the authentication and access control process 120 within the heartbeat data packets. Transmission of user authentication session information at checkpoint intervals serves to protect against conversion of any client process for the execution of unauthorized applications. Where the authentication and access control process 120 operates directly as an authentication server, user and client identifiers and the user password acquired by the agent program 48 are relayed through the agent monitor process 118. Authorization responses are generated and returned by the authentication and access control process 120 based on the user and client authentication policy information maintained by the authentication and access control process 120.

Figure 5A:
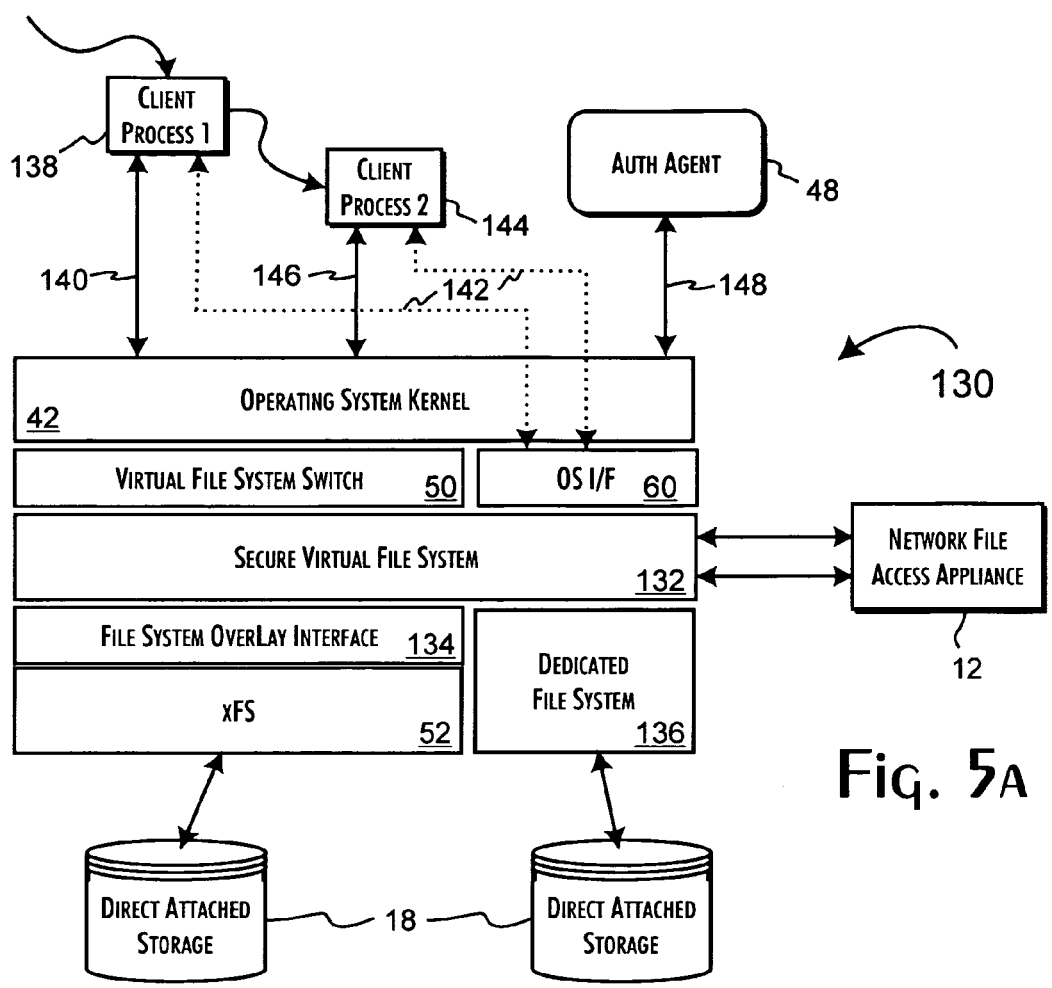
FIG. 5A provides a process interaction diagram showing the interoperation of platform processes with a secure file system layer executed by a platform computer system.

FIG. 5A shows a configuration 130 of the computer system platform 14 employing the second preferred embodiment of the security interposer layer 22 where the secure virtual file system 132 effectively combines the function of the secure network file system 58 and network file system daemon 62. While the secure virtual file system 132 may also use the NFS protocol for transferring file transfer requests and data with the network file access appliance 12, the secure virtual file system 132 preferably implements a non-standards compliant RPC-based message transfer protocol to obscure the information transferred between the computer system platform 14 and network file access appliance 12. A conventional interface to the virtual file system switch 50 is supported so that the secure virtual file system 132 appears to the switch 50 as an ordinary file system. The secure virtual file system 132 implements the extended operating system kernel 42 interface 60 to support operation of the authentication agent program 48. The secure virtual file system 132 also implements a conventional file system overlay interface 134, permitting functional capture and utilization of conventional file systems 52. Dedicated or proprietary file systems 136 may also be closely coupled to the secure virtual file system 132.

Figure 5B:
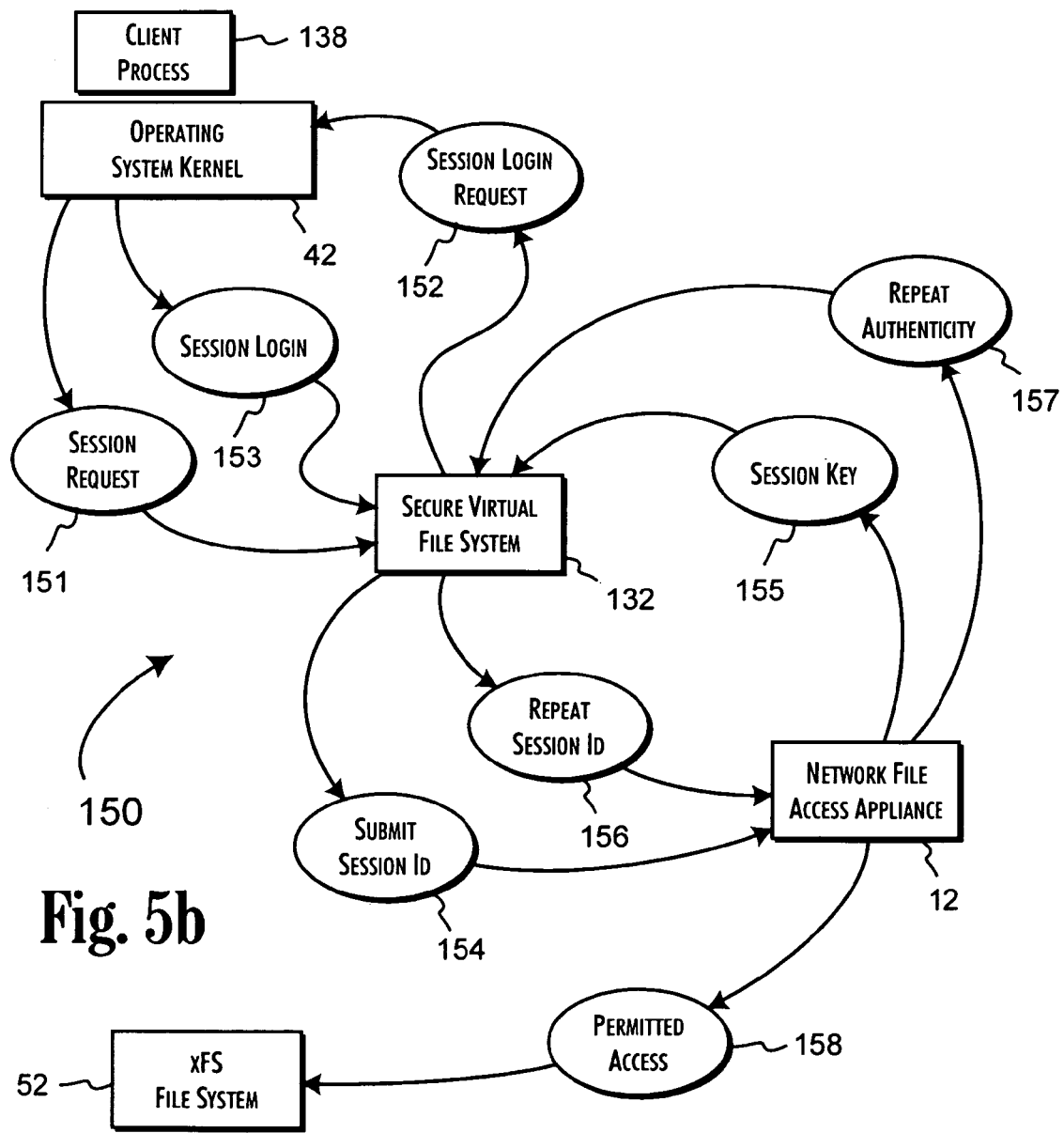
FIG. 5B illustrates the process flow integration of a preferred embodiment of the present invention into the login and execution process operations in accordance with a preferred embodiment of the present invention.

For both computer system platform 14 configurations 40, 130, user authentication enforcement is enabled by requiring a call to the agent program 48 in connection with the initialization of a new user process 138. As shown in FIG. 5B, following from the initialization of the new user process 151, the network file access appliance 12, through the secure virtual file system 132, causes the agent program 48 to present a session login 152 to the user 20 associated with the client process 138. User authentication is performed directly by a user mode component of the agent program 48 through a conventional authentication service, such as LDAP, against a user login and password. Alternately, user authentication can be direct through a pluggable authentication module generally consistent with DCE/OSF-RFC 86.0 (Unified Login with Pluggable Authentication Modules (PAM); www.opengroup.org/tech/rfc/rfc86.0.html). Upon authentication of the user 20, the agent program 48 initiates an authenticated user session 153 by submitting an authenticated user identification along with the login process identifier (LPID), user identifier (UID), and group identifier (GID) established by and collected from the operating system kernel 42. This session identification information is submitted through 154 the secure virtual file system 132 to the network file access appliance 12. A secure session key is then returned 155 to the agent program 48 for use in connection with subsequent file system requests initiated from the authenticated client process 138.

An authenticated user process 138 issues file requests to the operating system kernel 42, which are then passed to the secure virtual file system 132. A kernel mode portion of the agent program 48, operating in conjunction with the secure virtual file system 132, determines the source process identifier 142 for each file request 134, as received by the operating system kernel 42, by accessing conventional operating system kernel 42 structures. The authenticated user session information maintained by the agent program 48, located by the determined process identifier, is then provided to the secure virtual file system 132 for inclusion in the file transfer requests processed through the network file access appliance 12.

Client processes 144 spawned from an authenticated process 138 remain part of the parent authenticated user session. The chain of parent process identifiers is traced 142 by the agent program 48 to associate file requests 146 from child processes 144 with corresponding authenticated user sessions. Preferably, to support access management at the level of individual processes, both the authenticated user login parent process identifier (LPID) and the current process identifier (PID) are provided to the modified network layer for inclusion in the session and process corresponding file requests forwarded to the secure network file access appliance 12.

In a preferred embodiment of the present invention, the authenticated user session information, including a session identifier generated by the agent program 48, is encrypted using the session key as obtained through a secure key exchange with the agent monitoring process 118. The resulting extended NFS requests thus securely transports the session control information, including at least a session identifier, user identifier, group identifier, and process identifiers to the secure network file access appliance 12.

Preferably, the agent program 48 further supports authentication of user applications 44, 46, particularly including login shell applications, as loaded for execution in the authenticated user session processes 138, 144. Digitally signed applications loaded for execution can be verified conventionally by the agent program 48 against digital certificates obtained from a trusted PKI-based, LDAP or other authentication server. Application authentication information, such as the identity of the authentication server and certificate, can be potentially included, by the secure virtual file system 132, with the session information provided with corresponding file requests to support auditing of independently verified applications.

Autonomous application authentication by the agent program 48 is also supported through the secure network file access appliance 12. On the loading of an application for execution in a process 138, 144, the agent program 48 is called and executes, through the operating system kernel 42, to locate 148 the application binary image and retrieve the application file attributes, including the application filename, path, permissions, and file size. A secure hash signature is generated for the application binary. In a preferred embodiment of the present invention, a 20-byte hash signature is generated using the SHA-1 algorithm. An application authentication request, containing the hash signature, file attributes and a secure application token, is then passed to the secure network file access appliance 12 in an RPC directed to the agent monitoring process 118. The secure application token preferably includes a public key, of a public/private key pair stored by the secure network file access appliance 12 or trusted third-party authentication server, an application name, and a structure containing a secure hash signature of the application binary image and the application file attributes encrypted with the public key. The token is prior administratively generated through the secure network file access appliance 12 or other trusted application authenticator against an administratively determined authentic application. The tokens for authenticated applications are stored on or otherwise made accessible to the computer system platforms 14, 14'. The application file name located for the loaded binary image is used to further locate a corresponding token by the agent program 48.

On presentation of an application authentication request, the secure network file access appliance 12 compares the public key provided within the token against known valid public keys prior administratively registered with the secure network file access appliance 12. The decrypted token hash signature and file attributes are verified against the hash signature and file attributes separately provided in the request by the agent program 48 and a return RPC communicates the verification status to the agent program 48. Where the loaded application fails authentication, the corresponding application process 138, 144 can be terminated. Alternately, subsequently received network file system requests 140, 146 from an unauthorized application can be ignored or refused by the secure virtual file system 132.

Periodically, the agent program 48 may regenerate and resubmit 156 user session and application authentication requests to the secure network file access appliance 12. Alternately, or in addition, the secure network file access appliance 12 may direct the agent program 48 to regenerate and resubmit 157 application authentication information for specific user sessions. Thus, within an otherwise authenticated user session, the application authentication provisions of the present invention can enforce explicit and functional limitations on user process execution to a well defined set of authenticated applications.

Referring again to FIG. 4, packet control information 114 and application information 122, exposed by packet processing 112 and as received from the agent monitoring process 118, is provided to the authentication and access control process 120 for each network file data packet received by the secure network file access appliance 12. Preferably, the authentication and access control process 120 includes a policy store representing the administratively determined, functionally supported operations of the secure network file access appliance 12. The polices are preferably stored in a high-performance hash table permitting a policy lookup against the information 114, 122 as presented to the authentication and access control process 120. Audit logs of the file requests, as well as error logs and logs of refused operations are produced by the authentication and access control process 120.

Policy sets applicable to a received network file packet can be progressively discriminated based on any of the data provided in the packet control information 114. In particular, IP layer data provides source and destination IPs, permitting specific access constrains to be defined against defined clients, individually or by subnets. The standard NFS/CIFS layer data provides the requesting user UID and GID, as well as the fully qualified file or directory reference, including generally a mount point, file system path, and applicable file name. The application information 122 layer identifies the user session and provides the execution and parent process identifiers. Where utilized, the application information 122 layer also provides the application name and signature. Successful discrimination of the policy sets against the provided information 114, 122 enables and qualifies the processing of network file packets transported relative to the persistent storage resources 16.

Preferably, the handling of the various possible types of policy set discrimination failures is defined by the policy sets. Discrimination failures will typically include user authorization failures and unauthorized application execution attempts, unauthorized source IP addresses, and improper file references due to unavailability of the referenced file or lack of adequate user, group or file permissions. Depending on the nature of the failure, the discrimination failure handling defined by the policy sets will direct the production of detailed audit and error log entries and immediate issuance of administrative alarms, including potentially the automated generation of email and voice messages. The policy set discrimination failure handling preferably further defines the type and content of any NFS/CIFS network file error data packets generated by the NFS/CIFS state machine 124 and returned to a computer system platform 14, 14'.

In accordance with the present invention, the progressive discrimination of the policy sets also determines the active application of encryption and compression to the packet payload data 116. For inbound network file data packets from computer system platforms 14, 14', any combination of data provided in the control information 114, 122 can be utilized as a signature identifying whether the packet payload data is to be encrypted against a particular encryption key and compressed using a particular compression algorithm. A preferred basic policy set essentially defines the combinations of source IPs, user identifiers, and group identifiers permitted access through the mount point and, further, a default encryption key to be used, particularly for file creation. Multiple policy sets can be applicable to the same mount point, differing in the specification of source IPs, user identifiers, and group identifiers or by specification of additional control information, such as the path specification and file-type extension for the network file identified in the request. The policy sets are administratively managed to ensure that unique combinations of the provided control information resolve to distinct policy sets. Where path specification information is utilized to establish the scope of other wise matching policy sets, a best match of the path specification, file name, and file extension is preferably used to discriminate the default applicability of data encryption and compression.

Network file packets returned from persistent storage resources 16 are similarly processed 112 to expose the packet control information 114 and permit a combination of data to be considered in determining whether accompanying packet payload data requires decompression and decryption. While, in accordance with the present invention, encrypted network data packets returned from the persistent storage resources 16 can be presumed secure, examination of the control information 114 through authentication and access processing 120 enables an appropriate authentication of the source and sequence of the returned network file packets.

Preferably, packet payload data presented to the secure network file access appliance 12 and determined to be encrypted or compressed is processed into a sequence of logical access blocks (LABs) through an encryption and compression process 126. As part of the encryption and compression process 126, each logical access block is, in accordance with one preferred embodiment of the present invention, marked with at least an indirect identifier of the applicable encryption key and compression algorithm. Thus, while the decompression and decryption status of outbound network data packets may be suggested by a source directory specification, the applicable encryption key and compression algorithm is determined based on the encryption and compression identifiers associated with the logical access blocks. Decryption and decompression of the logical access blocks are, therefore, not essentially dependent on the directory specification or other independently alterable aspects of the network file.

Figure 6:
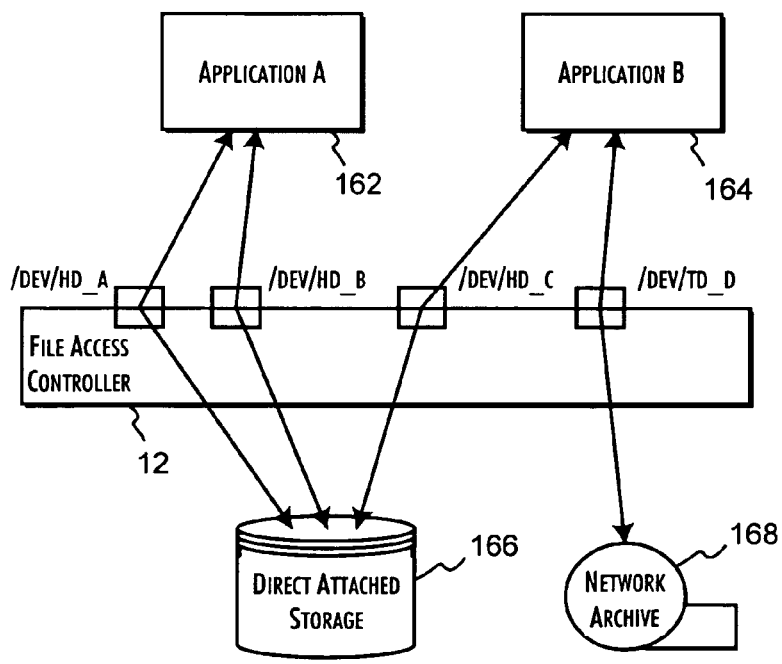
FIG. 6 provides a process interaction diagram illustrating the preferred exposure of network storage resources provided in a preferred embodiment of the present invention to provide multiple qualified views of the underlying file data.

Discrimination of applicable policy sets is, in accordance with the preferred embodiments of the present invention, expanded through the support by the secure network file access appliance 12 of multiple, inbound virtual mount points for various persistent storage resources 16. As shown in FIG. 6, multiple virtualized mount points /dev/hd_a, /dev/hd_b, /dev/hd_c, and /dev/td_d may be predefined administratively in the configuration of the secure network file access appliance 12 for the benefit of applications 162, 164 executed by the computer system platforms 14, 14'. These virtual mount points are independently associated through a defined mapping with the same, as by alias, or separate real mount points supported by various real storage resources 166, 168. Computer system platform 14 requests to mount any of the virtual mount point represented storage resources 166, 168 can be qualified and constrained by policy sets that, at a minimum, serve to validate the existence of the virtual mount point.

In accordance with the present invention, the virtual mount points further expand the ability to discriminate applicable access policy sets for the different applications 162, 164 executed by the computer system platform 14. The control information 114 provided with each file request directed to the secure network file access appliance 12 identifies a file request corresponding target mount point. In accordance with the preferred embodiments of the present invention, the authentication and access control process 120 logically selects an applicable policy set based on the identified virtual mount point. The further constraints represented by the selected policy set are concurrently used to determine how the network file data packet is to be processed. For example, otherwise authorized applications 162, 164 accessing the storage resource 166 through the /dev/hd_a virtual mount point may be constrained to read-only file data transactions. The separate policy set associated with the /dev/hd_b virtual mount point may support read-write access by only a well defined set of UIDs, further constrained to file data requests originating from a defined subnetwork.

As another example, read-write access of the storage resources 166 by the application 164, administratively limited to providing backup services, may be specially supported through the virtual mount point /dev/hd_c. Preferably, the policy set associated with the mount point /dev/hd_c preferably enables read-write access to the storage resources 166 though specifically disallowing decryption of existing encrypted files. The policy set for the virtual mount point /dev/td_d, in complementary fashion, provides for the encryption and compression of unencrypted files read from the storage resources 166 for writing to the archival storage resources 168. The /dev/td_d policy set symmetrically limits the decryption of files read from the archival storage resources 168 to those encrypted by the backup application 164. Consequently, a user with limited backup access rights can fully administer the backup and restore of files without breach of the secure storage of previously encrypted files. Thus, distinguishing policy sets based on virtualized mount points provides an extensive degree of flexibility in managing the access rights of the applications 162, 164 executed on behalf of a community of clients and users 20.

Network file packets permitted or refused by operation of the authentication and access control process 120 are signaled to an NFS/CIFS state machine 124, as shown in FIG. 4. The sequences of network file packets representing select file data transactions, including specifically NFS/CIFS transactions, are tracked by the NFS/CIFS state machine 124, in accordance with the present invention, to support the selective encryption and compression of NFS/CIFS network packet transferred file data and manage the attendant changes in the size and structure of network files as stored by the persistent storage resources 16. Mount and unmount request RPCs are essentially atomic operations between the computer system platforms 14, 14' and the secure network file access appliance 12. On receipt of a mount request, access is optionally determined by the authentication and access control process 120 based on the applicable policy set and a determination that the underlying network storage resource 16 identified with the corresponding real mount point is available. An RPC response acknowledging the success or failure of the mount or unmount request is then returned.

The NFS/CIFS state machine 124 tracks the state of each NFS/CIFS transaction processed through the secure network file access appliance 12. The principle NFS/CIFS transactions tracked include Read, Write, and Create. All other NFS/CIFS defined transactions (generically Requests) are also tracked by the NFS/CIFS state machine 124. The Read transaction, following from an inbound read request for file data defined by an offset and range, involves building a corresponding read request with the read offset adjusted back to an encryption and compression block boundary and the range adjusted to allow for the encryption and compression of the file data through to the end of a block boundary. The next states include issuing the read request to the persistent storage resources 16, receiving a responsive series of network read file data packets, and processing, as needed, to decrypt and decompress the received packet payload data. The final read transaction states include extracting the read file data for the originally requested offset and range and building and returning one or more network file data packets with the read file data.

An NFS/CIFS Write transaction requires a read/modify/write operation where existing stored file data is encrypted or compressed. A write transaction includes receiving a write request, building a lock request with a write lock offset adjusted back to an encryption and compression block boundary and the range adjusted to allow for the encryption and compression of the file data through to the end of a block boundary. The next transaction states include issuing a read request for any initial and final partial file data page including the adjusted write offset and range terminus, decrypting, decompressing and modifying the read data page to include the corresponding parts of the file write data as received from the client, encrypting and, as appropriate, compressing the file write data, and building and issuing corresponding write requests to the storage resources 166. The final write states include building and sending an unlock request to the storage resources 166 and building and sending a write request reply to the client.

NFS/CIFS Requests, such as get and set attributes, get access permissions, and make directory, are generally atomic transactions managed by the secure network file access appliance 12 to support infrastructure compatibility with the storage resources 166. Request transactions involve receiving a client request and building and sending a corresponding request to the storage resources 166. Upon receipt of a request response from the storage resources 166, adjustments are made for the reported file size and other attributes of the network file as stored on the storage resources 166 depending on the particular request involved in the transaction. A corresponding request response is then constructed and sent to the client.

An NFS/CIFS Create transaction involves receiving a file create request, constructing a file management header for the new file, and building and sending a corresponding request to the storage resources 166. Upon receipt of a request response from the storage resources 166, a corresponding request response is again constructed and sent to the client.

Figure 7:
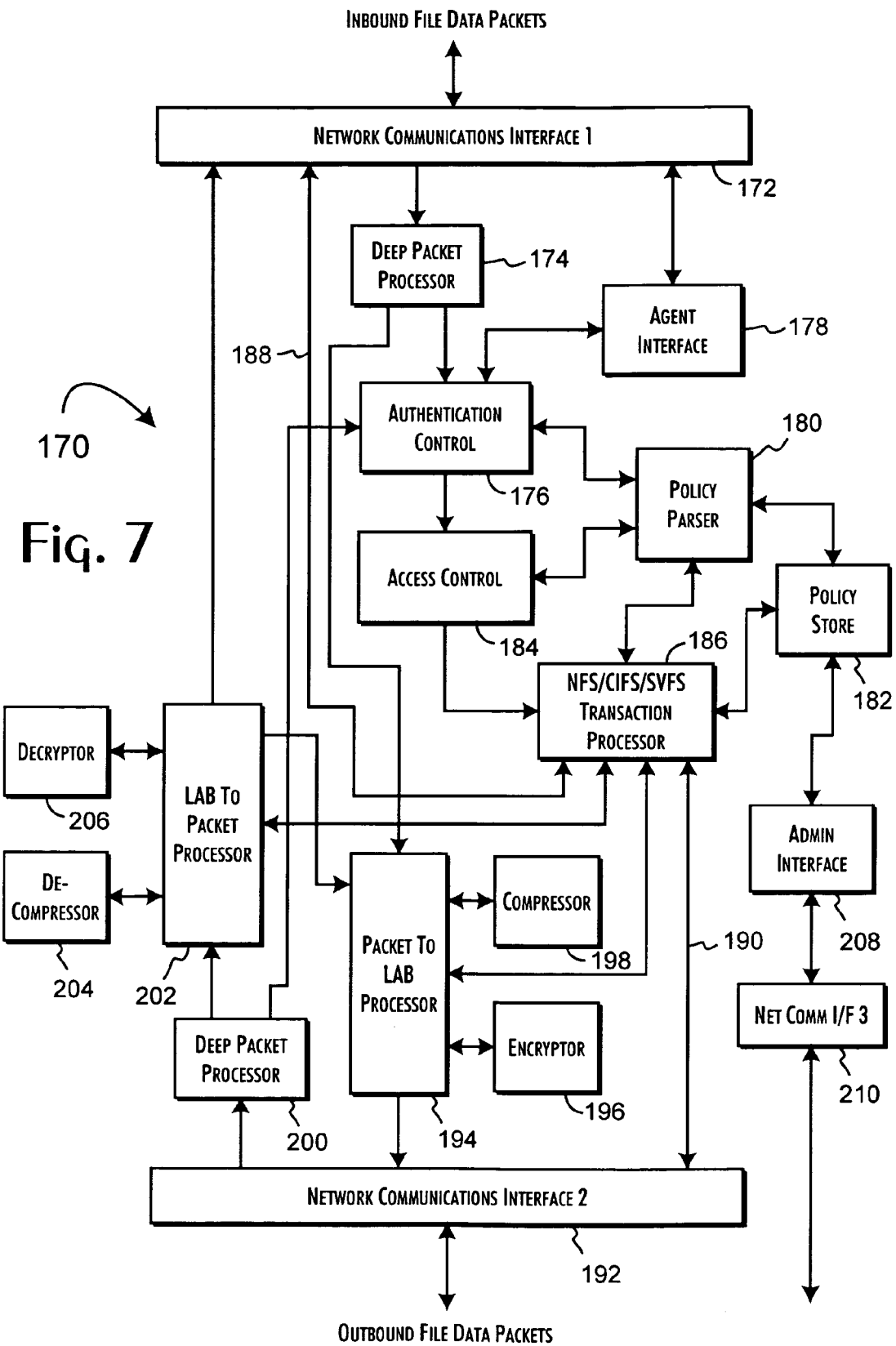
FIG. 7 is a software block diagram illustrating the preferred components implementing network packet protocol processing in accordance with a preferred embodiment of the present invention.

FIG. 7 provides a block diagram and flow representation of the software architecture 170 utilized in a preferred embodiment of the present invention. While the preferred embodiment utilizes separate ingress and egress network interfaces to the computer system platforms 14, 14', the two interfaces can share a single network interface adapter, provided the total bidirectional file transfer bandwidth is within the capabilities of the adapter. For either case, inbound network communications are processed through a first network interface 172. Network file data packets representing file transfer requests originating from applications 44, 46 are processed 174 to expose and deliver the network control information 114 for authentication processing 176. Application control information 122 collected from corresponding agent applications 48 are provided through an agent interface 178 in support of the authentication processing 176.

Based on interactions with a policy parser 180, selected elements of the network and application control information 114, 122 are compared with authentication parameters maintained in a policy data store 182. The policy parser 180 preferably implements decision tree logic to determine the level of authentication required for processing the network file request represented by the network file data packet received and whether that level of authentication has been met.

The network and application control information 114, 122 is also processed 184 to determine whether the authorized user is permitted access to the corresponding persistent storage resources 16. The policy processor 180 and policy data store 182 operate to determine whether the access attributes provided with the network file request are appropriate to enable access to the specific persistent storage resources 16 identified by the network file request.

While logically separate operations, the authentication and access processing 176, 184 are preferably performed concurrently. In a preferred embodiment of the present invention, a basic decision tree logic sequence considers the logical combination of network file operation requested, virtual mount point, target directory and file specification, user UID and GID, and the client/user session and process identifiers. Also considered is application authentication data provided with the network file request and as prior provided by the agent program 48 and the continuity state of the client session as periodically reported by the agent interface 178. Additional state data accumulated in relation to the nature, timing, and frequency of network file access requests is considered. This state data is accumulated by the secure network file access appliance 12 to support static time scheduling and quota controls over file access requests as well as dynamic traffic shaping of the file access operations processed through the secure network file access appliance 12. The accumulated state data also permits dynamic detection of patterns in file access requests that threshold qualify as intrusion attempts or other circumstances warranting issuance of an administrative alarm. The decision tree evaluation considers prior sequences of file access requests and thereby qualifies the permitted support of a current network file access request.

Policy data is administratively established to define the set of virtual mount points and the mapping of virtual mount points to real mount points. The policy data can also variously define whether application authentication is to be enforced as a prerequisite for session execution or operative response by the secure network file access appliance 12, a limited, permitted set of authenticated digital signatures of execution or response enabled applications, whether user session authentication extends to spawned processes or processes with a different UID or GID, and other data that can be used to match or otherwise discriminate, in operation of the policy parser 180, against the control information 114, 122. This administratively established policy data is logically accessed from the policy store 182 by the policy parser 180 in the evaluation of the network and application control information 114, 122. For the preferred embodiments of the present invention, the decision tree logic and policy data are stored in a hash table permitting rapid evaluation of the network and application control information 114, 122.

The network and application control information 114, 122, as well as the determined results of the authorization and access processing 176, 184 are control inputs to an NFS/CIFS state machine process 186. Non-file data messages, including various NFS/CIFS request and reply messages involved in the read, write, and create NFS/CIFS transaction sequences, are prepared and forwarded 188, 190 directly from the state machine process 186 to the inbound network interface 172 and an outbound network interface 192. Policy data needed to support the generation of network file request and reply data packets, such as virtual to real mount point mapping data, is accessed from the policy data store 182 as needed.

Where file data is included in a network file data packet inbound from an application 44, 46, the packet payload data 116 is processed 194 into a sequence of logical access blocks (LABs), provided the network file data packet is qualified through access processing 184 for encryption or compression. The packet payload data 116 of unqualified network file data packets are processed 194 unchanged into network data packets and provided to the network interface 192 for transmission through the security interposer 22 to the persistent storage resources 16.

As represented in FIG. 8A, the packet payload data of network file data packets corresponds to read and written portions of a file 220 recognized by a file system 26. Individual packet payload data 222, generally as shown in FIG. 8B, is preferably processed 194 into a sequence of logical access blocks $224_{1-N}$, as shown in FIG. 8c with each logical access block containing a corresponding portion of the packet payload data 222. In an initial embodiment of the present invention, the file management header 226 is virtualized for all files associated with a real mount point and locally stored by the hardware platform 70 effectively as part of the policy data held by the policy store 182. The applicable file management header is retrieved as part of the policy set applicable to the requested virtual mount point. The preferred embodiments of the present invention provide for the creation of a file management header 226 in connection with each Create file NFS/CIFS transaction. In one embodiment, the file management header 226 is created and written to the persistent storage resources 16 effectively as the first file data block as part of the creation of the file 220 on the persistent storage resources 16. One or more logical access blocks 224 can thereafter be appended to the file as created on the persistent storage resources 16 and, subsequently, read and written in random order. Alternately, to optimize the storage and retrieval of data with respect to the persistent storage resources 16, individual or subsets of logical access blocks 224 and the file management header 226 can be written to separate I/O pages within the same or different file spaces and storage devices. In either case, in accordance with the present invention, qualified file data reads and writes directed to the persistent storage resources 16 are performed as discrete, logical access block-aligned transfers encompassing the offset and range of a client network file data request.

The file management header 226 and logical access blocks 224 are repackaged in network file data packets as otherwise ordinary blocks of file data for transport to the persistent storage resources 16. The encryption and/or compression of network file data by secure network file access appliance 12 is thus entirely transparent to the reading and writing of relative to the persistent storage resources 16 by operation of the present invention.

A preferred structure of the file management header 226 is shown in FIG. 8D and further detailed in Table I below. Preferably, the file management header 226 includes a unique file GUID 228, security parameter index (SPI) 230, and a security signature 232. The file GUID 228 is preferably a SHA-1-based secure hash of data related to the file, such as the user UID, and file creation time to provide a 160-bit unique random identifier for the file. The security parameter index 230 is preferably a composite of security information including an encryption key identifier (Key) 234, a security options array (Idx) 236, and file related information (Info) 238.

The encryption key identifier 234 is preferably an encrypted representation of the encryption key name utilized to encrypt the file data contained in the logical access blocks of the file 220. Encryption key name/key value pairs are utilized by the secure network file access appliance 12 are administratively defined and stored in the policy data store 182. When, as a product of access processing 184, an encryption key is associated with a new file, the corresponding encryption key name is securely digested, again preferably using the SHA-1 algorithm, and stored in the key identifier field 234 of the file management header 226.

The security parameter index 230 may optionally also include a linked list storing, in encrypted form, the encryption key value for the file 220. Each entry in the linked list includes a public key, encrypted key value tuple. The public key corresponds to a trusted encryption key agent server and the encrypted key value is encrypted with the public key of the agent. On retrieval of the network file data by a different secure network file access appliance 12', the public key identified agent server can be used to recover the encrypted key value. Providing support for multiple independent agent servers ensures that the encrypted key value can always be recovered.

TABLE I

Management Header Structure

```
Struct MGT_BLOCK {
    U32 File_GUID[5];      // 160-bit unique random GUID for File
    U32 Mgt_Hdr_Ver;       // 32-bit version identifier for this structure
    U32 Size_Mgt_Blk;      // Size of the management block structure
    U32 Options[ ];        // Option include
                           // --IntegrityMode: to compare digital
                           //    signatures
                           // --OutOfBand: out-of-band meta-data used
                           // --CypherName: encryption algorithm ID
                           // --ComprName: compression algorithm ID
                           // --UserEncryption: Key_GUID is a user key
                           // --GroupEncryption: Key_GUID is a group
                           //    key
                           // --HaveKeys: has list of agent encrypted keys
    U32 Key_GUID[5];       // 160-bit GUID for Key, generated by
                           //    SHA-1(KeyName)
    U32                    // 160-bit GUID identifying the file creator
    Creator_GUID[5];
    BYTE Init_Vector[8];   // Initial seed value for LAB encryption;
                           //    encryption seeds are a function of
                           //    Init_Vector + LAB Offset
    U32 Padding[ ];
    U32 CRC;               // To verify management header block integrity
    BYTE Signature[128];   // Signature, signed with PrivKey for
                           // PublicKey_Verify Pre-computed.
                           // Signs only static part of the structure to
                           // avoid overhead on each file under the same
                           // volume/policy. CRC is signed as the last part
                           // so that changing to any part of the whole
                           // block is detected.
    *Key_Table             // Linked list of Public Key, agent encrypted
                           //    LAB Symmetric Key tuples
}
```

The security options array 236 provides an indexed list of the security functions applied to the logical access blocks 224 associated with file management header 226. These options preferably include identifiers of the whether encryption is used and the applicable encryption algorithm, whether compression is used and the applicable compression algorithm, whether the encryption key name lookup should be user or group based, whether an agent encrypted key list is present, and whether tamper detection through digital signature checking is to be enforced. The file related information 238 fields provide storage for various other information, such as a GUID corresponding to the file creator.

Finally, the security signature 232 provides storage for a cyclic redundancy check (CRC) value and digital signature. The CRC value is preferably computed over the binary value of the preceding portions of the file management header 226 to permit block integrity checking. The digital signature is computed for the preceding portions of the file management header 226 including the CRC field to enable detection of tampering with any portion of the file management header 226.

A preferred in-band structure of logical access blocks 224 is also shown in FIG. 8D. The primary fields of a logical access block 224 include a LAB data field 240, a LAB signature field 242, and an optional LAB compression header 244. The LAB data field 240 contains an encrypted and/or compressed portion of the packet payload data 222. The size of the LAB data field 240 is nominally set as a multiple of a natural or convenient block size recognized by the file system 26 and further chosen for block encryption algorithm efficiency.

In accordance with the present invention, segmentation of the packet payload data 222 into the logical access blocks 224 enables reasonably sized blocks of file data to be encrypted and compressed as atomic units. Smaller segments sizes are preferred for obtaining relatively efficient random read/write operations directed to the file 220 as stored by random access devices within the persistent storage resources 16. Larger segment sizes are preferred for lower processing overhead, greater encryption and compression efficiency, and where the target device within the network strange resources 16 is a streaming access device, such as a conventional tape drive. Preferably, the packet payload data 222 segment size has a block modulo of eight bytes with a minimum size of 512 bytes and a nominally preferred size of 1024 bytes for random access devices. For streaming access devices, larger block sizes on the order of 8096 bytes may be preferred.

Where the last segment of the packet payload data 222 is less than the nominally preferred segment size, a smaller block size is used. This smaller block size is chosen to be the largest modulo eight byte block size that is the same or smaller than the size of the last segment. All but at most seven bytes of the last segment are then block encrypted. Any remaining segment bytes are then XORed with a mask value generated by the encryption of an eight-byte length, zero-value string and then appended to the block encrypted portion of the last segment.

The LAB compression header 242, preferably included only where the packet payload segment held by the logical access block 224 is compressed, includes fields specifying the offset and range of the file data contained within the LAB data field 240. Dependent on the underlying data values and the stream compression algorithm applied, the segment length or range of the packet payload data 222 stored in the LAB data field 240 is variable. The segment length is manipulated to obtain compressed data that closely approaches the preferred LAB data field size. Padding is provided to reach a modulo eight-byte encryption block compatible size. At a minimum, the range value identifies the actual compressed data carried in a completed logical access block 224.

The LAB signature 244 is preferably computed as a secure digest of the LAB data field 240 and, where present, the LAB compression header 242. In the preferred embodiments of the present invention, an SHA-1 algorithm is used to create the LAB signature 244. The security of each logical access block 244, when retrieved to the secure network file access appliance 12, can be assured against tampering by recomputing the secure digest of the LAB data field 240, including any LAB compression header 242, and comparing against the LAB signature 244. For a preferred variant of the present invention, network file data is stored as logical access blocks 224 containing only unencrypted, uncompressed LAB data 240 and LAB signatures 244. While the efficiency of random access over network file data is maintained, modifications potentially due to improper tampering with the contents of the network file are nonetheless detectable on an individual logical access block 224 level. The conventional necessity of reading the entire network file to compute a secure digest to detect tampering is not required.

In an alternate embodiment of the present invention, an error correction trailer 246 is provided to store an ECC value computed over the LAB data field 240, any LAB compression header 242 and the LAB signature 244. ECC values are computed on creation of the logical access blocks 244. Upon retrieval of logical access blocks 244, the ECC value is used to correct bit errors that may occur as a consequence of extended network infrastructure transport of the logical access blocks 244. In particular, bit errors may be introduced by network routers operating at the TCP layer and above. Such infrastructure induced bit errors are otherwise detected from the LAB signature 244, but are then indistinguishable from data tampering. Use of the error correction field 246 serves to independently protect the integrity of the logical access blocks 244.

The file management header 226 and the headers 244 and trailers 242, 246 of the logical access blocks 244 may be included in-band, or in-file, as generally represented in FIG. 8D, as part of the file 220 as ultimately stored by the persistent storage resources 16. Different in-band layouts can also be used to optimize access to the logical access block data 240. The file management header 226, digital signatures 242, and compression headers 244 can be collected into one or more in-band super blocks. The size of these super blocks and the remaining logical access block data 240 can be sized to optimize I/O performance of the persistent storage resources 16.

Alternately, and potentially preferred, only the logical access block data 240 is stored by the persistent storage resources 16 in-band as the network file 220. The file meta-data, including the management header 226 and the headers 244 and trailers 242, 246, corresponding to a network file 220 are stored in a separate, meta-data or shadow file. Any parallel storage structure that maintains the relationship between the shadow file and the in-band network file 220 may be used. The shadow files can be created and stored on the network resources 16 within the same storage space as the network files 220, within a different storage space potentially physically remote from the network files 220, or on the platform 70 provided the parallel association of the shadow files with the network files 220 is maintained. For example, shadow files can be stored in the same directory with the counterpart network files 220 and identified by file names that are a defined permutation of the network file 220 file names. The shadow files can alternately be stored in a parallel directory structure diverging from a defined root or relative root node of the persistent storage resources 16. In either case, the defined relationship between the shadow files and the corresponding network files 220 is determined and known to the secure network file access appliance 12, which can ensure the parallel reading and writing of the shadow files with corresponding reading and writing of the network files 220.

Referring again to FIG. 7, the packet to LAB processing 194 preferably utilizes, as required, the hardware accelerators 62 to perform encryption 196 and compression 198 over the segments of packet payload data 222. The logical access blocks $224_{1-N}$ together containing the packet payload data 222 of a network file data packet, are then collected into a new network file data packet and passed to the network interface 192 for transport to the networks storage resources 16.

Network file data packets received through the network interface 192 are similarly processed 200 to expose and deliver the network control information 114 for authentication and access processing 176, 184 and logical access blocks $224_{1-N}$ contained in the packet payload data to a logical access block to packet data process 202. The provision for authentication and access processing 176, 184 permits even distributed, potentially client-based network storage devices to be equally secured and made accessible as other persistent storage resources 16. In the preferred embodiments of the present invention, minimal authentication and access processing 176, 184 is performed for network file data packets received from dedicated persistent storage resources 16.

The logical access blocks $224_{1-N}$ received in the packet payload data are processed 202 to apply error correction, where the error correction field 246 is present, and validate the integrity of the LAB data fields 240, including the LAB compression headers 244 if present, against the digital signature 242 values. The file management header 226 is read, typically in advance, by the NFS/CIFS state machine process 186 to obtain the encryption key identifier from the field 234 and compression algorithm identity, if applicable from the options index field 236. The LAB data fields 240 are then decompressed 204, if applicable, and decrypted 206. The NFS/CIFS state machine process 186, based on the pending inbound file data read request transaction, identifies an offset and range-selected portion of the combined logical access block $224_{1-N}$ data representing client read requested data. The selected data is then incorporated into a network file data packet and provided to the network interface 172 for transport to the transaction identified application 44, 46.

For the preferred embodiments of the present invention, an administration interface 208 provides access to and configuration of the policy parser 180 and policy data store 182. A network communications interface 210 provides access to the administration interface 208 independent of the inbound and outbound network interfaces 172, 192.

Figure 9:
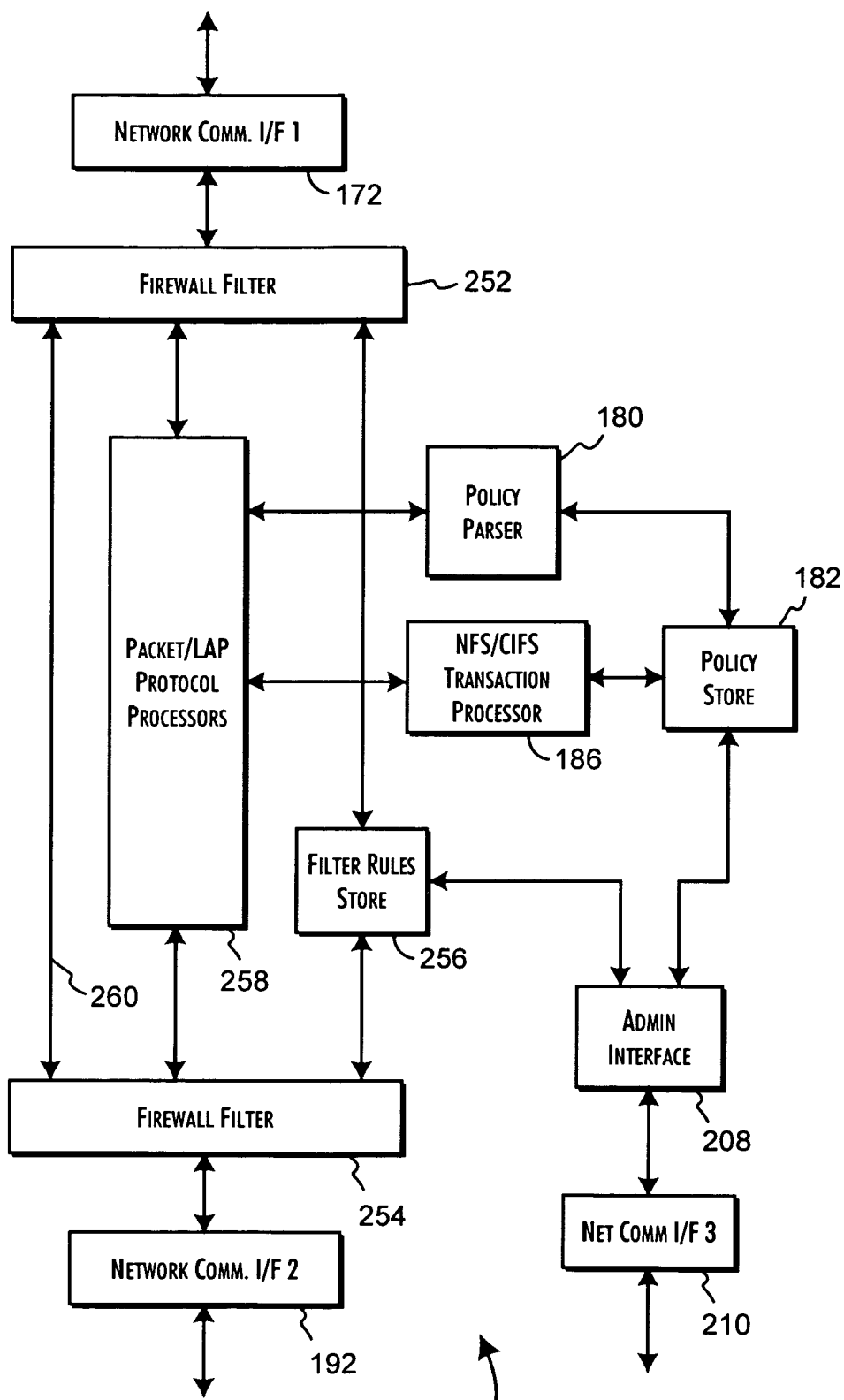
FIG. 9 is a software block diagram illustrating an extended network packet protocol processing including firewall processing in accordance with a preferred embodiment of the present invention.

The software architecture 170 is preferably extended, as shown in FIG. 9, to provide additional security appliance-oriented features. The extended architecture 250 includes IP filter layers 252, 254 implementing firewall-type filtering for network connections made through the network interfaces 172, 192. A filter rules store 256 preferably maintains iptables-type specifications that define the IP addresses, network protocols, and internet ports permitted to pass network packets through the IP filter layers 252, 254. Preferably, the IP filter layers 252, 254, and particularly the inbound IP filter layer 252, is set to reject all connections except those pertaining to network file access operations, including the NFS, CIFS, RPC, and mount protocols. These network file data packets passed by the IP filter layers 252, 254 are directed for packet/LAB processing 258 as performed by the software architecture 170. Unauthorized connection attempts and access requests lacking adequate policy-based permissions are therefore preferentially received, detected, and audited by the software architecture 170.

The flexible analysis capabilities of the authentication and access controls 176, 184 and policy parser 180, particularly based on access to the full set of control information 114, 122, allows a more refined identification of potential abuse patterns and a wider variety of remedial actions, including dynamically blocking specific source IPs, logging detailed information, and issuing real-time administrative alerts. The security and reporting strength of the firewall filters 252, 254 is appropriate for handling connection attempts unrelated to the primary functions of the secure network file access appliance 12. The firewall filters 252, 254 may also be utilized to proxy selected network data packets, including potentially network file data packets, through the secure network file access appliance 12, utilizing a bypass route 260. In the case of VPN 42 and network file access appliance 12' designated source IP addresses and protocols can be identified and appropriately bypassed 260.

For the fixed scale, hardware platform 70, the firewall filters 252, 254 are preferably implemented through the kernel execution of the operating system iptables module by the main processors 54. On the scalable hardware platform 80, the firewall filter layers 252, 254 are preferably implemented on the ingress and egress processors 86, 88, with the bypass routed network packets being passed directly between the ingress and egress processors 86, 88. The filter rules maintained in the filter rules store 256 are administered through the administration interface 208.

An NFS/CIFS read transaction 270, structured in accordance with a preferred embodiment of the present invention, is shown graphically in Figure LOA. A read target file, consisting of a file management header 226 and a sequence of logical access blocks $224_{1-N}$ exists on the persistent storage resources 16. In general, an inbound read request identifies an offset and range of data to read 272. Outbound read requests are issued to read 274, 276 the file management header 226 and an encompassing, block-aligned sequence of logical access blocks $224_{A-X}$. The read request 276 retrieves the requested logical access blocks $224_{A-X}$ in a series of one or more network file data packets, which are then processed to complete the inbound read request by returning one or more network file data packets containing the read request data 272.

Figure 10A:
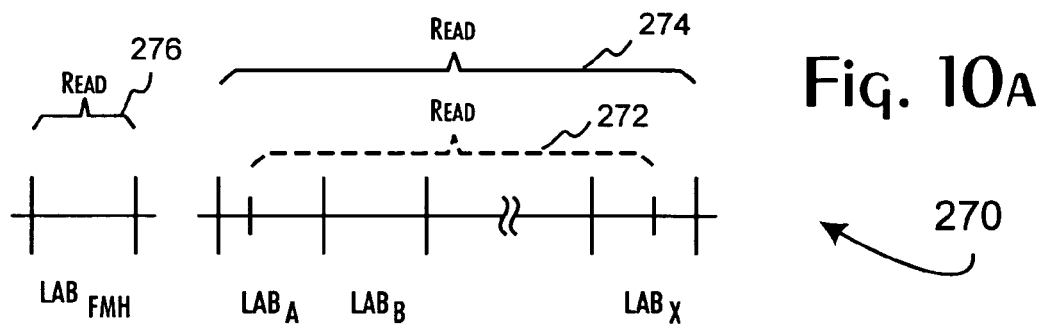
FIGS. 10A-B illustrate the process flow of a file system read request and response performed in accordance with a preferred embodiment of the present invention.
Figure 10B:
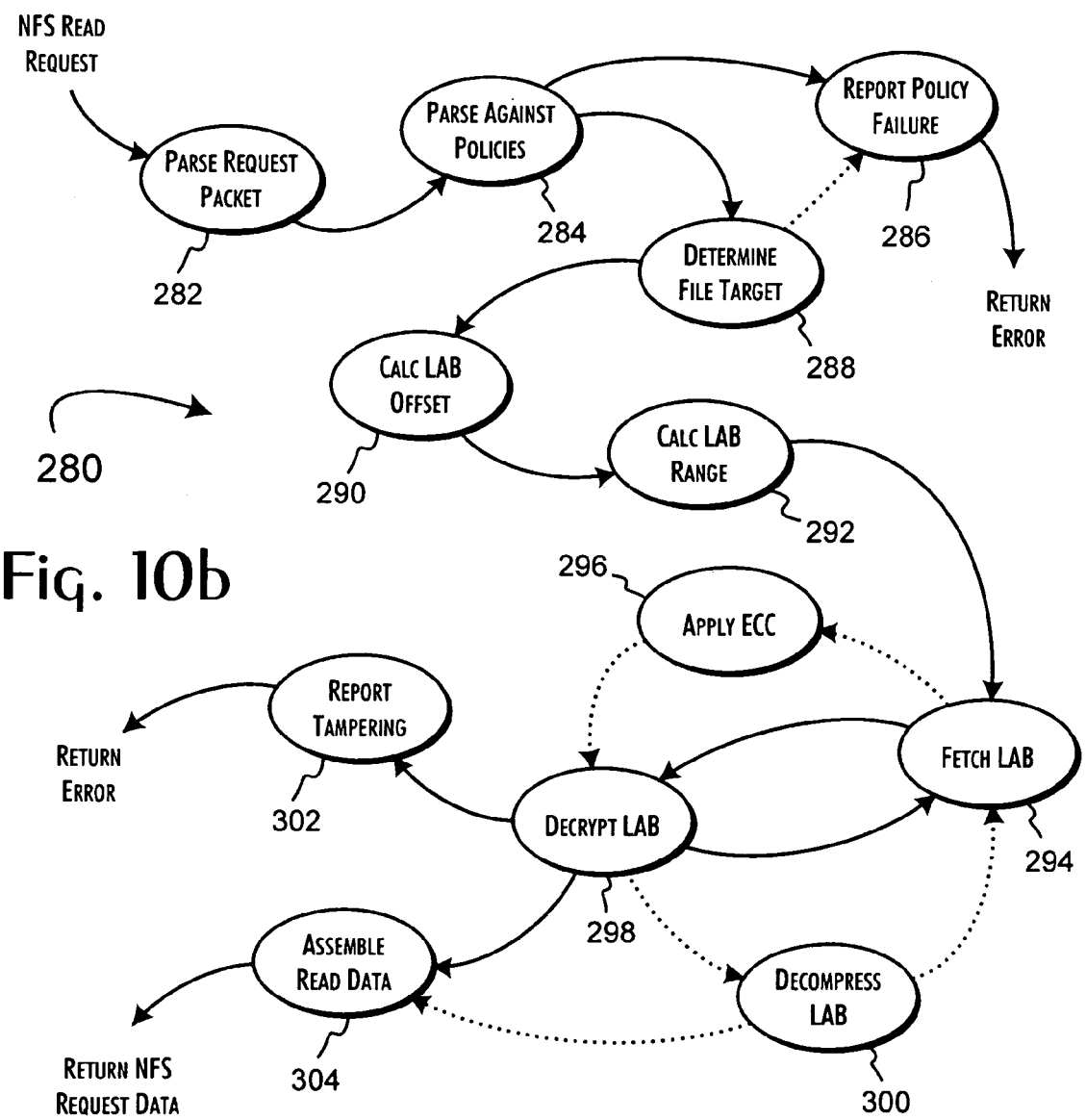

The specific processing 280 associated with an NFS/CIFS read transaction 270 is shown in FIG. 10B. The secure network file access appliance 12, on receiving a firewall-filtered file data read request, exposes 282 and parses 284 the network control information 114 against the policy rules and data 182, 184. A policy compliance failure is reported 286 by return issuance of an NFS/CIFS appropriate reply network data packet.

Where the read request complies with the defined policy requirements, the file related access control information is optionally read 288 from the persistent storage resources 16 to confirm existence of the file and evaluate applicable read data permissions. Where the permissions check is performed and fails, nonexistence of the file or inadequate permissions are reported 286 without issuing the read file request to the persistent storage resources 16. The file meta-data, including the file management header 226 for the request target file, is also read 288 from the network storage resource 16. A block-aligned logical access block offset 290 and range 292 are determined and used to create and issue an outbound read request directed to the persistent storage resources 16. The read data offset is adjusted to account for the size of the file management header 226 as stored at the beginning of the file. Where the logical access blocks $224_{A-X}$ contain compressed data, file data reads of the LAB compression headers 244 may be required to determine adjustments to both the read data offset and an encompassing read request range.

As the requested logical access blocks $224_{A-X}$ are received 294, error correction is applied 296, depending on whether the LAB ECC field 246 is present, decrypted 298 utilizing the key associated with the key name determined from the key identifier field 234 of the file management header 226, and decompressed 300, depending on whether the file management header 226 includes the compression option and identifies a corresponding algorithm. The LAB digital signatures 242 are used to check the integrity of the retrieved file data. A failure of the integrity check for any of the logical access blocks $224_{A-X}$ may result in a re-reading of some or all of the logical access blocks $224_{A-X}$, to protect against soft-errors, with persistent errors being ultimately reported by the return issuance of an NFS/CIFS appropriate error network data packet. Preferably, both soft and persistent errors are logged by the secure network file access appliance 12. Persistent errors, recognized through the operation of the NFS/CIFS state machine processing 186 of the inbound read request, are further preferably asserted against the policy parser 180 for evaluation and subsequently issued 302 as a tampering alert message through the administrative interface 208. Finally, as file data is received and processed in response to the outbound read request, the file data identified in the inbound read request is assembled 304 into one or more reply network file dot packets and returned.

Figure 11A:
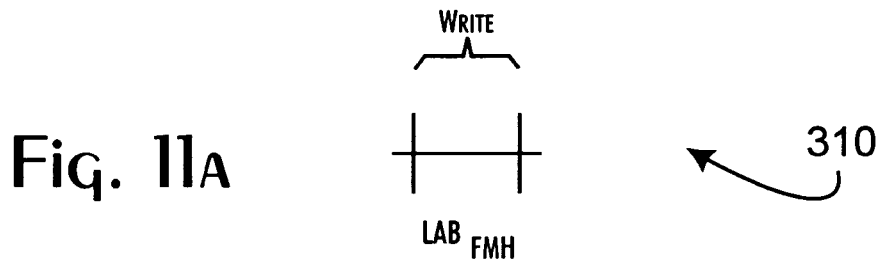
FIGS. 11A-B illustrate the process flow of a file system file create request performed in accordance with a preferred embodiment of the present invention.
Figure 11B:
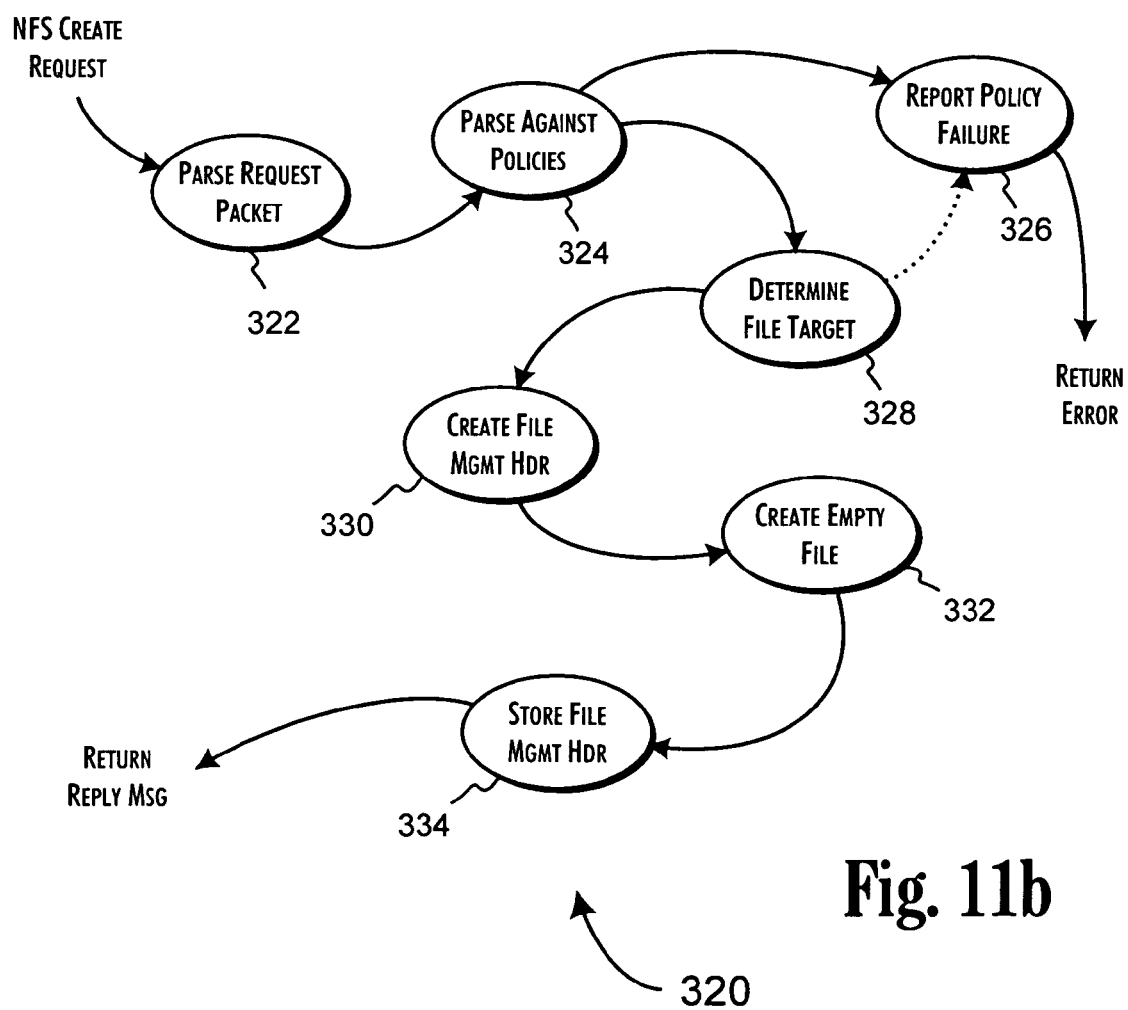

An NFS/CIFS create file transaction 310, as shown graphically in FIG. 11A, preferably operates to create a new file containing a new file management header 226. As further detailed in FIG. 11B, a create file request process 320 initially exposes 322 and parses 324 the network control information 114, with any policy compliance failures resulting in the return issuance of an NFS/CIFS appropriate reply network data packet. Provided the file create request complies with the defined policy requirements, directory information is optionally read 328 from the persistent storage resources 16 to obtain the target file creation permissions. Where the permissions check is performed and fails, non-existence of the target directory and inadequate permissions are reported 326 without asserting a create file request to the persistent storage resources 16.

A file management header 226 is then created 330. Through operation of the NFS/CIFS state machine processing 186, the policy parser 180, based on the stored values provided from the policy data store 182, generates and provides the necessary values for the security parameter index 230. In particular, the policy parser 180 preferably associates encryption keys and compression choices against directory specifications, including mount points. Thus, the target location of the file to be created is utilized to determine whether encryption and compression are to be applied and the applicable key and algorithms for implementation. A secure identifier based on the key name and compression and compression algorithm identifiers are computed and stored in the new file management header 226 along with computed CRC and signature values.

The NFS/CIFS state machine 186 next provides for the creation and issuance 332 of an NFS/CIFS create file request to the persistent storage resources 16 utilizing the directory specification provided by the inbound create file request. For in-band storage of the file management header 226, an NFS/CIFS file write request, containing the file management header 226, is then created and issued 334 to the persistent storage resources 16. Where a shadow meta-data file is designated for use, an NFS/CIFS file create and write requests, the latter containing the file management header 226, are created and issued 334 to the persistent storage resources 16 to create the shadow file. Finally, an NFS/CIFS appropriate create file reply network data packet is returned to the client.

Figure 12A:
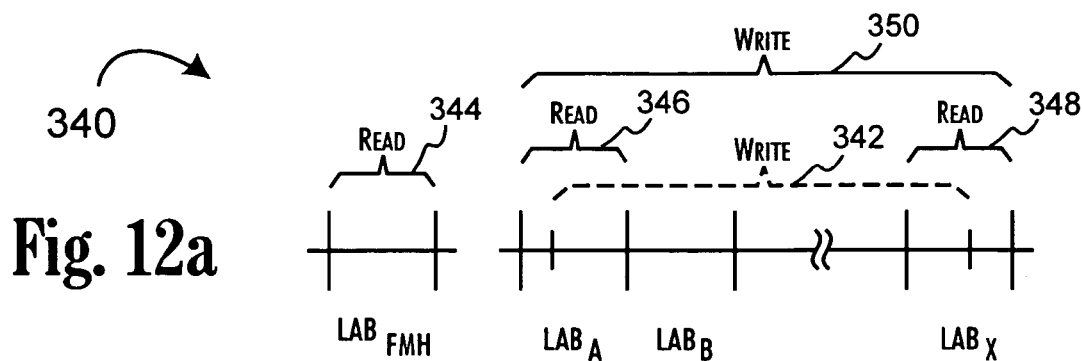
FIGS. 12A-B illustrate the process flow of a file system write request and response performed in accordance with a preferred embodiment of the present invention.

An NFS/CIFS write transaction 340, structured in accordance with a preferred embodiment of the present invention, is shown graphically in FIG. 12A. The write of file data to an existing file in the persistent storage resources 16 uses a read, modify, write procedure. An inbound write data request specifies an offset and range of write data 342 that is provided in a transaction sequence of one or more network file data packets. In most instances, the write request data will be unaligned to the logical access blocks $224_{1-N}$ existing in the stored file. The file management header 226 and any partially overlapped logical access blocks $224_A$, $224_X$ are preemptively read 344, 346, 348, permitting the overlapped logical access blocks $224_A$, $224_X$ to be decrypted and decompressed as required. An overlay of the inbound write data 342 with the block-aligned read data is then performed. The resulting block-aligned write data is then processed into logical access blocks $224_{A-X}$ and written 350 in a write transaction sequence of one or more network file data packets to the persistent storage resources 16.

Figure 12B:
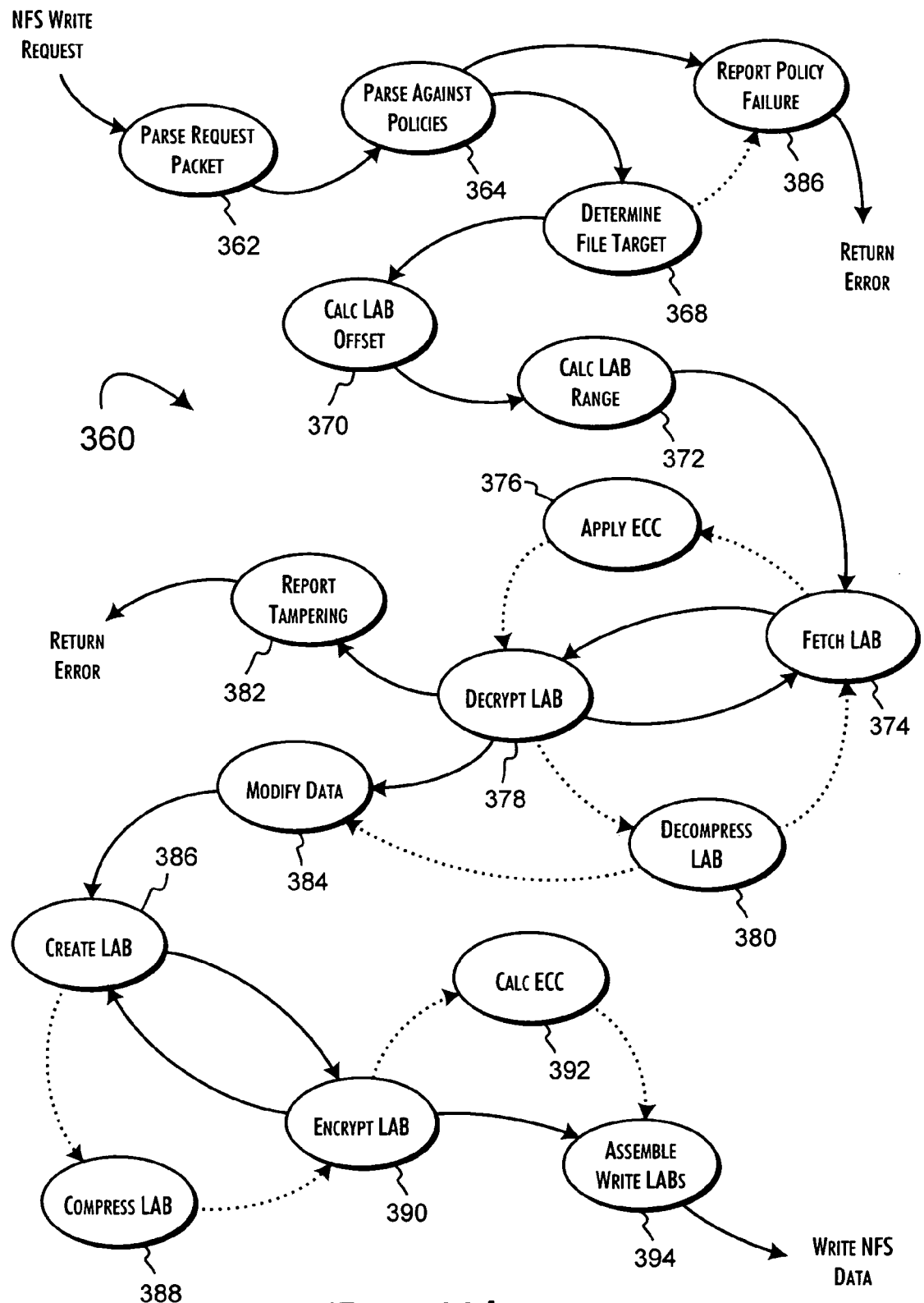

The preferred process 360 of performing an NFS/CIFS write request transaction is shown in FIG. 12B. The received write file data request is received and processed 362 to expose the network control information 114. This information is then parsed 364 against the established policies 180, 182, with any compliance failures being reported 386. The network control information 114 is then further processed 368 to identify the target file stored by the persistent storage resources 16, create and issue read requests to obtain the file meta-data, including the file management header 226. The logical access block offset and range are then determined 370, 372, adjusting as needed for the presence of the file management header 226 and compression of the logical access block 224 contained data. A file lock is asserted against the range logical access blocks $224_{A-X}$. The initial and terminal logical access blocks $224_A$, $224_X$ are read 374 from the persistent storage resources 16, corrected 376 if the LAB ECC field 246 is present, decrypted 378, and decompressed 380, as needed. Integrity failure errors are reported 382. Data from the terminal logical access blocks $224_A$, $224_X$ are merged 384 with the write data 342 and the combined data is resegmented 386, compressed 388 as appropriate, and encrypted 390. As applicable, LAB ECC values are computed and added 392 to the assembled 394 series of logical access blocks $224_{A-X}$. As the logical access blocks $224_{A-X}$ are assembled, one or more write network file data packets are constructed and sent to the persistent storage resources 16. Once the writing the logical access blocks $224_{A-X}$ has completed, the file lock is released.

Thus, a secure file system server and methods of efficiently and reliably securing persistently stored data accessible through the file system sever has been described. In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method of securing the transfer of persistently stored data between a computer system and a persistent data store, wherein said computer system includes a processor supporting the execution of an operating system kernel and a file system to transfer data with respect to said persistent data store, said method comprising the steps of:

a) associating user session information with data transfer requests provided from said operating system kernel;
b) providing said user session information and said data transfer requests to a security processor system, external to and secured independent of said computer system, to determine permitted data transfer operations;
c) routing, between said operating system and said file system, the persistently stored data corresponding to said permitted data transfer operations exclusively through said independent security processor system
d) acquiring said user session information through said operating system kernel; and
e) decrypting, by said independent security processor system, persistently stored data retrieved through said file system, said step of decrypting utilizing decryption keys identified only by reference by said data transfer requests.

2. The method of claim 1 wherein said step of decrypting includes retrieving a predetermined decryption key in correspondence with a predetermined data transfer request, wherein said predetermined decryption key is retrieved independent of said computer system.

3. The method of claim 2 wherein, in performance of said step of decrypting, said predetermined decryption key is held by said security processor system inaccessible from said computer system.

4. A method of securing persistently stored file data stored by a persistent storage device and accessible through a computer server system including a processor, an operating system executable by said processor including an operating system kernel providing a first file system interface and a second file system interface to said persistent storage device, said method comprising the steps of:

a) coupling an independently operating encryption processor server system supporting the transparent encryption and decryption of persistent file data to said computer server system through a defined communications channel;
b) associating session information obtained through said operating system kernel with a predetermined persistent file data transfer request identifying predetermined persistent file data;
c) providing said predetermined persistent file data transfer request and said session information to said independently operating encryption processor server system through said defined communications channel;
d) routing said predetermined persistent file data as transferred between said first and second file system interfaces through said independently operating encryption processor server system
e) maintaining inaccessible, by said independently operating encryption processor server system from said computer server system through said defined communications channel, an encryption key associated with said predetermined persistent file data transfer request; and
f) determining, by said independently operating encryption processor server system, said encryption key from said predetermined persistent file data transfer request, wherein said step of determining predetermines the access authorization of said predetermined persistent file data transfer request with respect to said session information and an access policy store maintained by said independently operating encryption processor server system.

5. The method of claim 4 wherein said step of maintaining further maintains inaccessible, by said independently operating encryption processor server system from said computer server system through said defined communications channel, said access policy store.

6. The method of claim 5 wherein said step of maintaining inaccessible prevents access to said encryption key and said access policy store through said defined communications channel independent of a security breach of said computer server system.

7. A computer system providing for the secure transfer of persistently stored data with respect to a persistent data store, said computer system comprising:

a) a secured computer system including a memory, a data persistence interface coupleable to a persistent data store, a network security interface, and a processor coupled to said memory, to said data persistence interface, and to said network security interface, said processor being operative to execute, within said memory, an operating system kernel, a file system coupled to said data persistence interface to transfer secured data with respect to said persistent data store, and a security interposer layer coupled between said operating system kernel and said file system, wherein execution of said security interposer layer is operative to associate user session information with data transfer requests provided from said operating system kernel and to transfer said secured data between said operating system kernel and said file system; and b) a security processor system external to and secured independent of said secured computer system, said security processor system including a policy data store providing for the storage of data operation policies and corresponding data cipher keys, wherein said security processor system is coupleable to said network security interface to interoperate with said secured computer system to determine permitted data transfer operations through said interposer layer, including decryption and transfer of said secured data retrieved through said file system, utilizing cipher keys identified only by reference by said data transfer and said user session information.

8. The computer system of claim 7 wherein decryption and transfer of said secured data includes retrieving a predetermined cipher key in correspondence with a predetermined data transfer request, wherein said predetermined cipher key is retrieved independent of said operating system kernel and said file system.

9. The method of claim 8 wherein, in decryption and transfer of said secured data, said predetermined cipher key is held inaccessible from said operating system kernel and said file system.

10. The computer system of claim 9 wherein said predetermined cipher key is held inaccessible by said security processor system through said network security interface independent of a security breach of said secured computer server system.

* * * * *